United States Patent
Jones et al.

(10) Patent No.: US 10,450,868 B2
(45) Date of Patent: *Oct. 22, 2019

(54) TURBINE ROTOR BLADE WITH COUPON HAVING CORRUGATED SURFACE(S)

(71) Applicant: General Electric Company, Schenectady, NY (US)

(72) Inventors: Jeffrey Clarence Jones, Simpsonville, SC (US); Adam John Fredmonski, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 499 days.

This patent is subject to a terminal disclaimer.

(21) Appl. No.: 15/217,053

(22) Filed: Jul. 22, 2016

(65) Prior Publication Data

US 2018/0023395 A1    Jan. 25, 2018

(51) Int. Cl.
| | | |
|---|---|---|
| *F01D 5/18* | (2006.01) | |
| *F01D 5/14* | (2006.01) | |
| *F01D 9/06* | (2006.01) | |

(52) U.S. Cl.
CPC ............. *F01D 5/141* (2013.01); *F01D 5/145* (2013.01); *F01D 5/147* (2013.01); *F01D 5/186* (2013.01);
(Continued)

(58) Field of Classification Search
CPC .......... F01D 5/187; F01D 5/186; F01D 5/145; F01D 5/141; F01D 5/147; F01D 9/065; F05D 2260/22141; F05D 2250/61; F05D 2250/181; F05D 2250/182; F05D 2240/121; F05D 2240/122
See application file for complete search history.

(56) References Cited

U.S. PATENT DOCUMENTS 3,650,635 A * 3/1972 Wachtell .............. B22D 27/045
                                                        415/115
4,830,315 A   5/1989 Presz, Jr. et al.
(Continued)

FOREIGN PATENT DOCUMENTS

| EP | 107433 | 7/2001 |
|---|---|---|
| EP | 2361720 | 8/2011 |

(Continued)

OTHER PUBLICATIONS

Denton "The Trailing Edge Loss of Transonic Turbine Blades" Journal of Turbomachinery, Apr. 1990, vol. 112 pp. 277-285.
(Continued)

*Primary Examiner* — Ninh H. Nguyen
*Assistant Examiner* — Maxime M Adjagbe
(74) *Attorney, Agent, or Firm* — Dale Davis; Hoffman Warnick LLC

(57) ABSTRACT

A turbine rotor blade includes an airfoil body having a leading edge, a trailing edge and a smooth outer surface. A cutout is included within at least one of the leading edge and the trailing edge, the cutout removing a predetermined area of the airfoil body. A coupon is coupled in the cutout to replace the predetermined area of the airfoil body. The coupon includes a first corrugated surface on at least a portion of an outer surface thereof. The coupon allows for the addition of advantageous wake mixing and cooling efficiencies to preexisting blades.

18 Claims, 30 Drawing Sheets

(52) U.S. Cl.
CPC ............. *F01D 5/187* (2013.01); *F01D 9/065* (2013.01); *F05D 2240/121* (2013.01); *F05D 2240/122* (2013.01); *F05D 2240/303* (2013.01); *F05D 2240/304* (2013.01); *F05D 2250/181* (2013.01); *F05D 2250/182* (2013.01); *F05D 2250/183* (2013.01); *F05D 2250/184* (2013.01); *F05D 2250/61* (2013.01); *F05D 2260/204* (2013.01); *F05D 2260/22141* (2013.01); *Y02T 50/673* (2013.01); *Y02T 50/676* (2013.01)

(56) References Cited

U.S. PATENT DOCUMENTS

| | | | |
|---|---|---|---|
| 5,269,057 | A | 12/1993 | Mendham |
| 5,269,507 | A | 12/1993 | Yoshida |
| 5,704,763 | A | 1/1998 | Lee |
| 6,092,766 | A * | 7/2000 | LaRoche ................ B64C 21/10 244/198 |
| 6,508,000 | B2 * | 1/2003 | Burke ..................... B23P 6/005 29/889.1 |
| 6,733,240 | B2 | 5/2004 | Gliebe |
| 7,156,619 | B2 * | 1/2007 | Papple ................... F01D 5/187 415/115 |
| 7,234,978 | B2 | 6/2007 | Pade |
| 7,303,376 | B2 | 12/2007 | Liang |
| 7,377,746 | B2 | 5/2008 | Brassfield et al. |
| 7,736,123 | B2 | 6/2010 | Lee et al. |
| 7,871,246 | B2 | 1/2011 | Liang |
| 7,972,115 | B2 * | 7/2011 | Potier ....................... F01D 5/20 416/228 |
| 8,414,263 | B1 | 4/2013 | Liang |
| 8,419,372 | B2 | 4/2013 | Wood et al. |
| 8,506,836 | B2 | 8/2013 | Szuromi et al. |
| 8,573,541 | B2 | 11/2013 | Sullivan et al. |
| 8,608,429 | B2 | 12/2013 | Gupta et al. |
| 8,814,529 | B2 | 8/2014 | Fiala et al. |
| 8,910,361 | B2 | 12/2014 | Rickenbacher et al. |
| 8,944,774 | B2 | 2/2015 | Bielek |
| 8,974,249 | B2 | 3/2015 | Zhang |
| 9,062,554 | B2 | 6/2015 | Bielek |
| 9,121,294 | B2 | 9/2015 | Kray et al. |
| 9,249,666 | B2 | 2/2016 | Wood et al. |
| 9,267,383 | B2 | 2/2016 | Batt et al. |
| 2012/0216542 | A1 | 8/2012 | Siden et al. |
| 2013/0156549 | A1 * | 6/2013 | Maldonado ............ F01D 5/189 415/115 |
| 2013/0291548 | A1 | 11/2013 | Ingram et al. |
| 2014/0301860 | A1 | 10/2014 | Ramm et al. |
| 2015/0086376 | A1 | 3/2015 | Fandrei, II |
| 2015/0086408 | A1 | 3/2015 | Kottilingam et al. |
| 2015/0114003 | A1 | 4/2015 | McMahan et al. |
| 2015/0147164 | A1 * | 5/2015 | Cui ......................... F01D 5/188 415/175 |
| 2015/0147585 | A1 * | 5/2015 | Schwarze ............. B22F 3/1055 428/546 |
| 2015/0167979 | A1 | 6/2015 | Siden et al. |
| 2015/0184519 | A1 | 7/2015 | Foster et al. |
| 2015/0184520 | A1 | 7/2015 | Potter et al. |
| 2015/0184537 | A1 | 7/2015 | Smith |
| 2015/0198050 | A1 | 7/2015 | Lee et al. |
| 2016/0069185 | A1 | 3/2016 | Stankowski et al. |
| 2017/0159442 | A1 * | 6/2017 | Velazquez, Jr. ......... F01D 5/141 |

FOREIGN PATENT DOCUMENTS

| | | |
|---|---|---|
| JP | 63-195302 | 8/1988 |
| JP | 07-332007 | 12/1995 |
| WO | 2013/120999 | 8/2013 |
| WO | 2015/191041 | 12/2015 |

OTHER PUBLICATIONS

Pallos "Gas Turbine Repair Technology" GER-3957B (Apr. 2001) 30 pages.
U.S. Appl. No. 15/217,062, Office Action dated Jan. 17, 2019, 23 pages.
U.S. Appl. No. 15/217,012, Office Action dated Jan. 25, 2019, 17 pages.
U.S. Appl. No. 15/217,041, Office Action dated Jan. 30, 2019, 24 pages.
U.S. Appl. No. 15/217,033, Office Action dated Feb. 4, 2019, 17 pages.
U.S. Appl. No. 15/217,062, Notice of Allowance dated Jul. 9, 2019, 6 pages.
U.S. Appl. No. 15/217,062, Final Office Action dated Apr. 18, 2019, 30 pages.
U.S. Appl. No. 15/217,033, Notice of Allowance dated Jun. 12, 2019, 13 pgs.
U.S. Appl. No. 15/217,041, Notice of Allowance dated Jun. 3, 2019, 10 pgs.

* cited by examiner

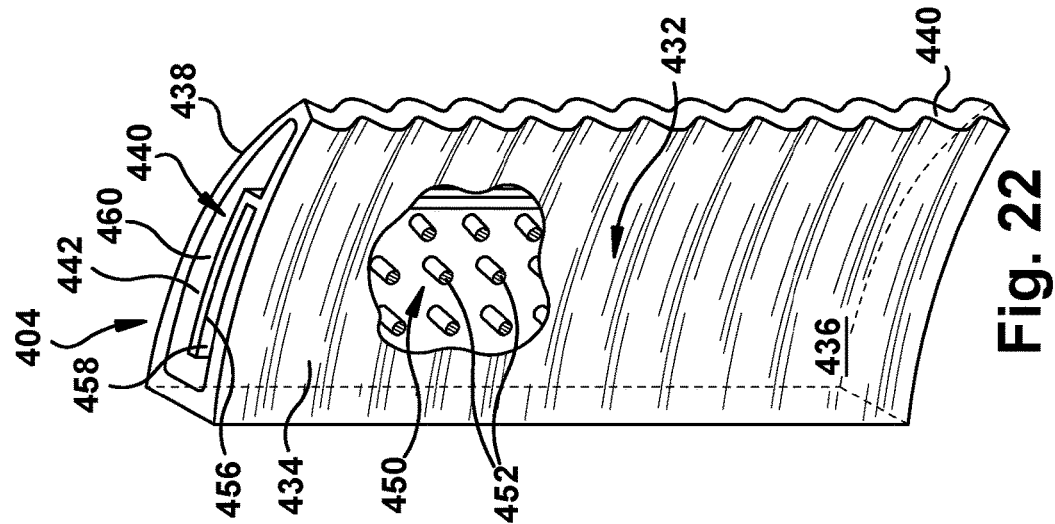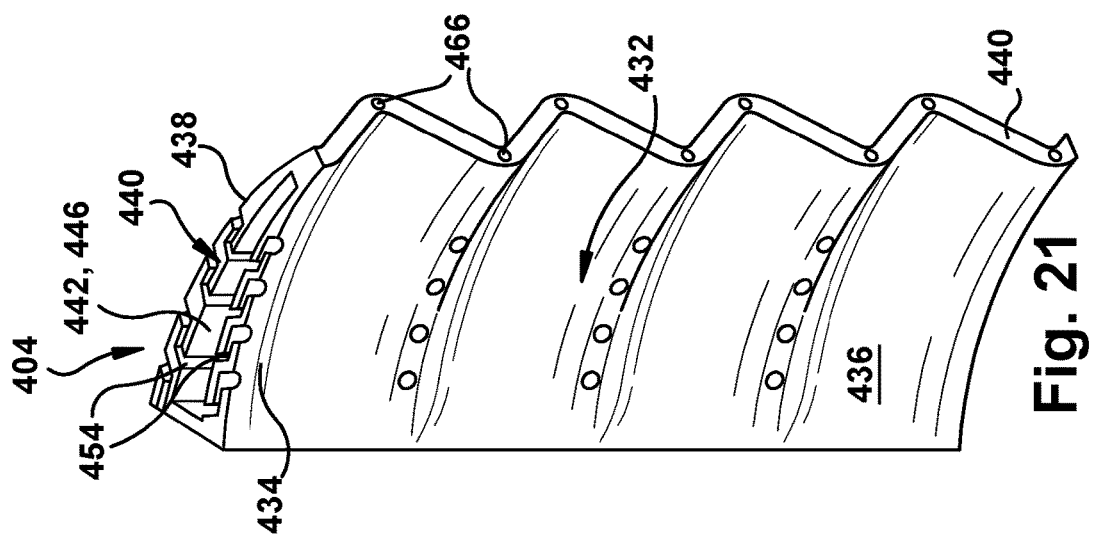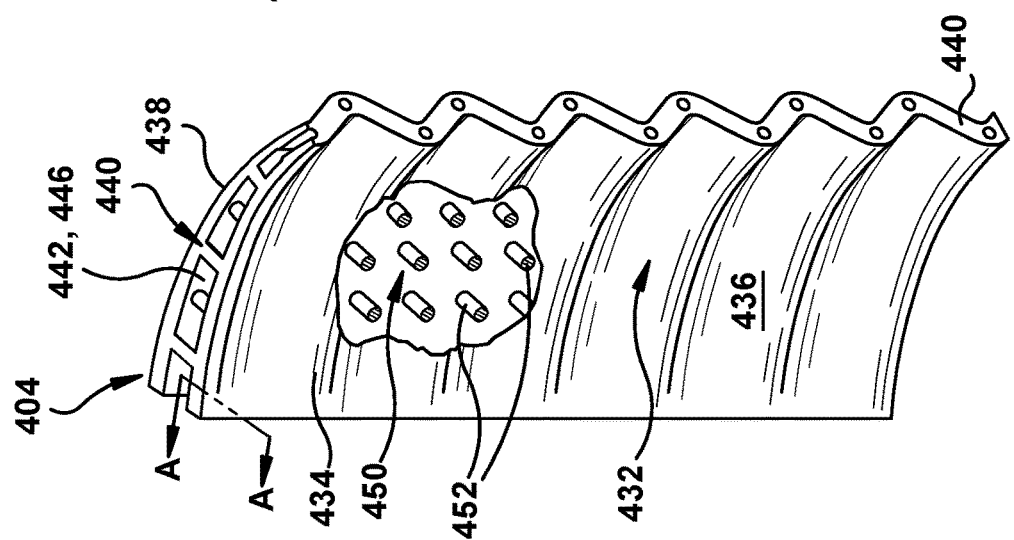

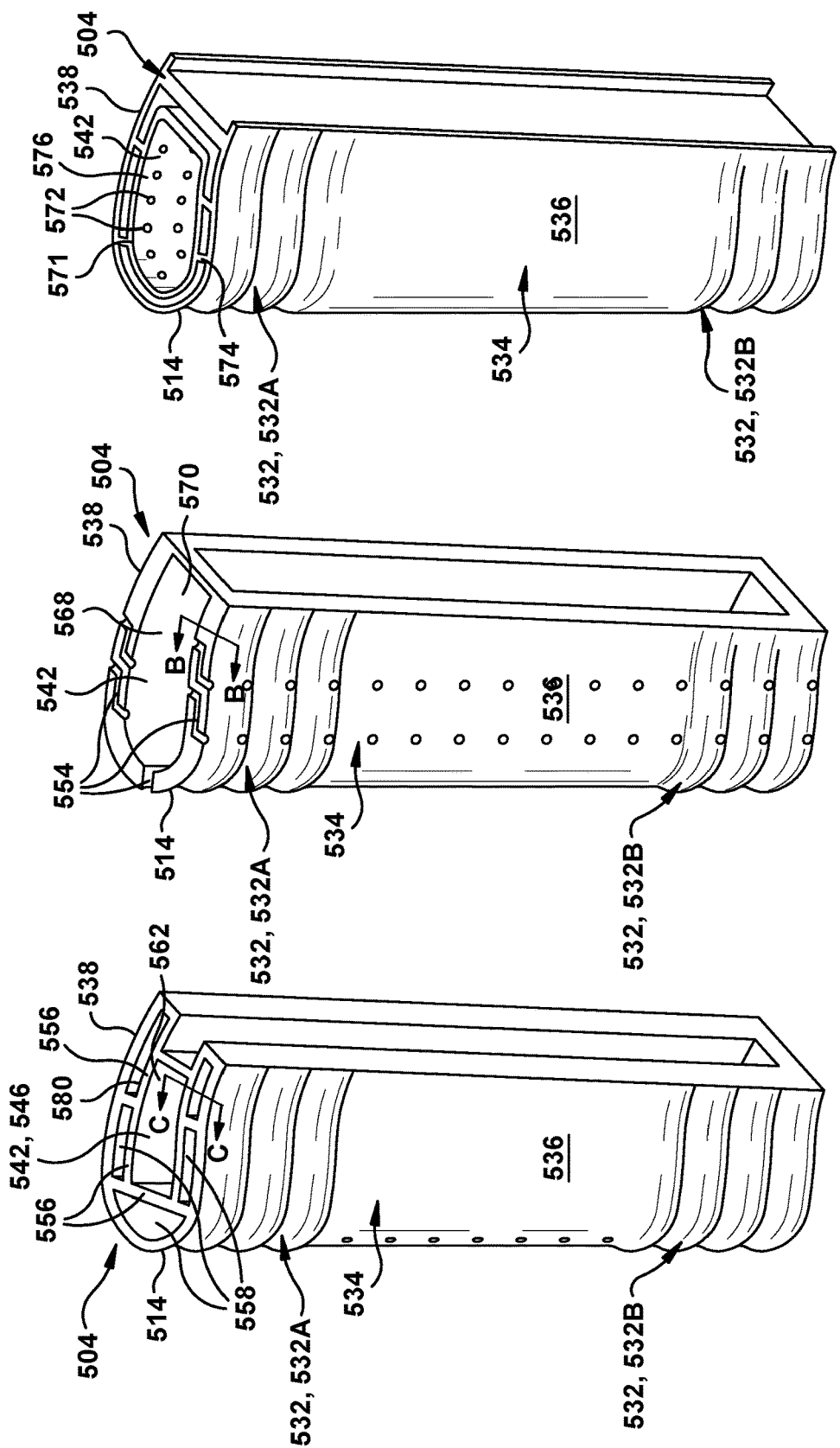

TURBINE ROTOR BLADE WITH COUPON HAVING CORRUGATED SURFACE(S)

BACKGROUND OF THE INVENTION

The disclosure relates generally to turbomachine blades, and more particularly, to a turbine rotor blade or a turbine vane having a coupon for a cutout in a leading edge or trailing edge, where the coupon includes corrugated outer surface(s).

Turbomachine blades (rotor blades or stationary vanes) include airfoils that accelerate flow through contraction of area and the introduction of tangential velocity. The relative flow velocity exiting, for example, a gas turbine airfoil is quite high, typically with Mach numbers of 0.5 or higher. The finite thickness of an airfoil trailing edge, however, creates a velocity deficit, i.e., a wake, which introduces losses in the flow through viscous mixing. FIG. 1 shows an example of a typical unsteady loss process for a turbine rotor blade row 10 operating behind a turbine vane row 12. At location 14, a wake is generated by a finite trailing edge thickness of the airfoil of vane row 12, resulting in aerodynamic losses due to mixing of the wake with the mainstream. At location 16, the wake interacts with potential field of a downstream airfoil of rotor blade row 10, and it begins to distort. At location 18, the wake is segregated into discrete packages by the leading edge of airfoils in rotor blade row 10. At location 20, a pressure gradient in the airfoil passage (between rotor blades of blade row 10) causes wake packets to stretch and migrate, causing aerodynamic losses due to mixing of the wake packets (referred to as "free stream mixing"). That is, when the wake is ingested into a downstream airfoil of rotor blade row 10, the wake undergoes a stretching and dilation process that exacerbates the losses associated with the mixing. At location 22, the wake packets interact with the boundary layer of the rotor blades in blade row 10 downstream of the airfoils' wake, causing higher aerodynamic losses (airfoil surface losses). Unsteady loss caused by this phenomenon is present in all turbomachinery in various forms.

In order to address the above challenges, turbine rotor blades or turbine vanes having airfoils with enhanced wake mixing structures have been proposed. The wake mixing structures can take a variety of forms such as crenulated or serrated trailing edges on the airfoils. These structures, however, are limited in their applicability because they must be formed or machined into the airfoil surface, which is a difficult and expensive process.

In addition to wake mixing, combustion or gas turbine engines (hereinafter "gas turbines") include turbine rotor blades or vanes that must be actively cooled. In particular, gas turbines include a compressor, a combustor, and a turbine. As is well known in the art, in gas turbines, air compressed in the compressor is mixed with fuel and ignited in the combustor and then expanded through the turbine to produce power. The components within the turbine, particularly the circumferentially arrayed rotor and stator blades, are subjected to a hostile environment characterized by the extremely high temperatures and pressures of the combustion products that are expended therethrough. In order to withstand the repetitive thermal cycling as well as the extreme temperatures and mechanical stresses of this environment, the airfoils must have a robust structure and be actively cooled.

As will be appreciated, turbine rotor blades and vanes often contain internal passages or circuits that form a cooling system through which a coolant, typically air bled from the compressor, is circulated. Such cooling circuits are typically formed by internal ribs that provide the required structural support for the airfoil, and include multiple flow path arrangements to maintain the airfoil within an acceptable temperature profile. The air passing through these cooling circuits often is vented through film cooling apertures formed on the leading edge, trailing edge, suction side, and/or pressure side of the airfoil.

It will be appreciated that the efficiency of gas turbines increases as firing temperatures rise. Because of this, there is a constant demand for technological advances that enable blades to withstand ever higher temperatures. These advances sometimes include new materials that are capable of withstanding the higher temperatures, but just as often they involve improving the internal configuration of the airfoil so to enhance the blade's structure and cooling capabilities. However, because the use of coolant decreases the efficiency of the engine, new arrangements that rely too heavily on increased levels of coolant usage merely trade one inefficiency for another. As a result, there continues to be demand for new airfoil arrangements that offer internal airfoil configurations and coolant circulation that improves coolant efficiency.

A consideration that further complicates arrangement of internally cooled airfoils is the temperature differential that develops during operation between the airfoil's internal and external structure. That is, because they are exposed to the hot gas path, the external walls of the airfoil typically reside at much higher temperatures during operation than many of the internal ribs, which, for example, may have coolant flowing through passages defined to each side of them. In fact, a common airfoil configuration includes a "four-wall" arrangement in which lengthy inner ribs run parallel to the pressure and suction side outer walls. It is known that high cooling efficiency can be achieved by the near-wall flow passages that are formed in the four-wall arrangement. A challenge with the near-wall flow passages is that the outer walls experience a significantly greater level of thermal expansion than the inner walls. Various rib configurations have been devised to address these challenges. Preexisting blades present additional challenges because they have predetermined coolant flow passages and flow directing outer surfaces that cannot be readily altered to address the above-described challenges.

BRIEF DESCRIPTION OF THE INVENTION

A first aspect of the disclosure provides a turbine rotor blade including: an airfoil body having a leading edge, a trailing edge and a smooth outer surface; a cutout within at least one of the leading edge and the trailing edge, the cutout removing a predetermined area of the airfoil body; and a coupon coupled in the cutout to replace the predetermined area of the airfoil body, the coupon including a first corrugated surface on at least a portion of an outer surface thereof.

A second aspect of the disclosure provides a coupon for replacing a cutout of a predetermined area in an airfoil body of a turbine rotor blade, the airfoil body having a leading edge, a trailing edge and a smooth outer surface, the cutout within at least one of the leading edge and the trailing edge of the airfoil body, the coupon including: a first corrugated surface on at least a portion of an outer surface thereof.

A third aspect of the disclosure provides a non-transitory computer readable storage medium storing code representative of a coupon for replacing a cutout of a predetermined area in one of a leading edge or a trailing edge in an airfoil body of a turbine rotor blade, the coupon physically generated upon execution of the code by a computerized additive manufacturing system, the code including: code representing the coupon, the coupon including: a first corrugated surface on at least a portion of an outer surface thereof.

A fourth aspect of the disclosure provides a turbine vane including: an airfoil body having a leading edge, a trailing edge and a smooth outer surface; a cutout within at least one of the leading edge and the trailing edge, the cutout removing a predetermined area of the airfoil body; and a coupon coupled in the cutout to replace the predetermined area of the airfoil body, the coupon including a first corrugated surface on at least a portion of an outer surface thereof.

A fifth aspect of the disclosure provides a coupon for replacing a cutout of a predetermined area in an airfoil body of a turbine vane, the airfoil body having a leading edge, a trailing edge and a smooth outer surface, the cutout within at least one of the leading edge and the trailing edge of the airfoil body, the coupon including: a first corrugated surface on at least a portion of an outer surface thereof.

A sixth aspect of the disclosure provides a non-transitory computer readable storage medium storing code representative of a coupon for replacing a cutout of a predetermined area in one of a leading edge or a trailing edge in an airfoil body of a turbine vane, the coupon physically generated upon execution of the code by a computerized additive manufacturing system, the code including: code representing the coupon, the coupon including: a first corrugated surface on at least a portion of an outer surface thereof.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 18-25 show various views of a coupon having a corrugated surface for a trailing edge of a turbine rotor blade according to embodiments of the disclosure.

FIGS. 26-31 show various views of a coupon having a corrugated surface for a leading edge of a turbine rotor blade according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
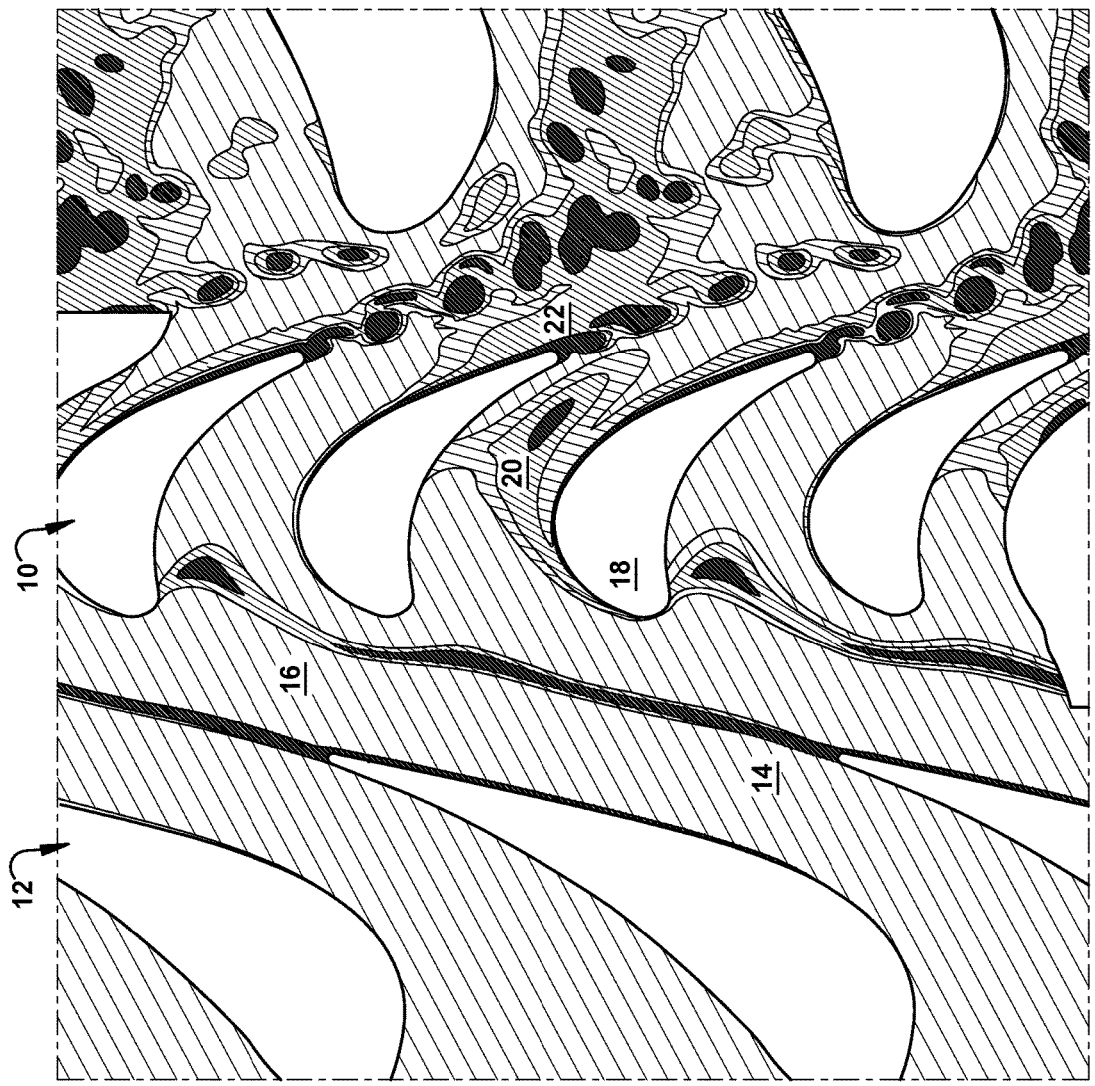
FIG. 1 shows a schematic view of conventional aerodynamic flow within a turbomachine.

As an initial matter, in order to clearly describe the current disclosure it will become necessary to select certain terminology when referring to and describing relevant machine components within a gas turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbomachine.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

Figure 2:
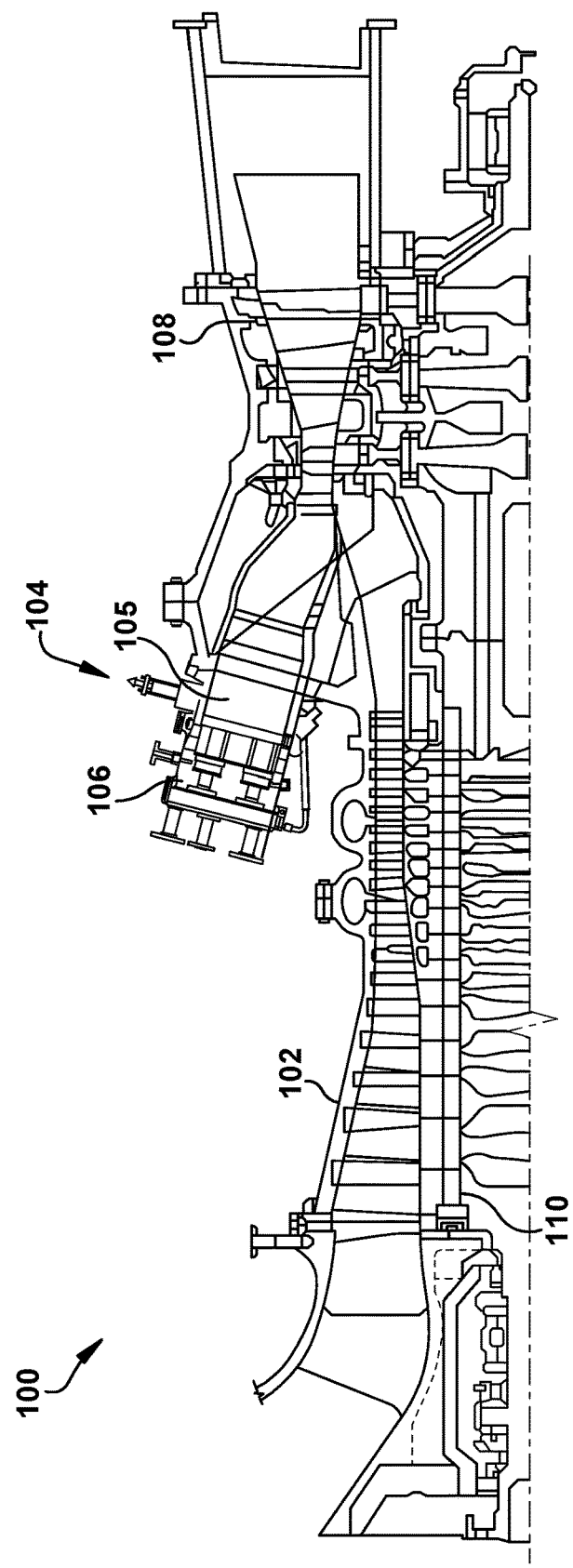
FIG. 2 shows a schematic view of an illustrative turbomachine in the form of a gas turbine system.

FIG. 2 shows a schematic illustration of an illustrative turbomachine 100 in the form of a combustion or gas turbine system. Turbomachine 100 includes a compressor 102 and a combustor 104. Combustor 104 includes a combustion region 105 and a fuel nozzle assembly 106.

Turbomachine 100 also includes a turbine 108 and a common compressor/turbine shaft 110 (sometimes referred to as rotor 110). In one embodiment, the combustion turbine system is a MS7001FB engine, sometimes referred to as a 9FB engine, commercially available from General Electric Company, Greenville, S.C. The present disclosure is not limited to any one particular combustion turbine system and may be implanted in connection with other engines including, for example, the MS7001FA (7FA), the MS9001FA (9FA), the 7HA and the 9HA engine models of General Electric Company. Furthermore, the present disclosure is not limited to any particular turbomachine, and may be applicable to, for example, steam turbines, jet engines, compressors, turbofans, etc.

In operation, air flows through compressor 102 and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 2) and channels fuel and air to combustion region 105. Combustor 104 ignites and combusts fuel. Combustor 104 is in flow communication with turbine 108 for which gas stream thermal energy is converted to mechanical rotational energy. Turbine 108 is rotatably coupled to and drives rotor 110. Compressor 102 also is rotatably coupled to rotor 110. In the illustrative embodiment, there is a plurality of combustors 104 and fuel nozzle assemblies 106.

Figure 3:
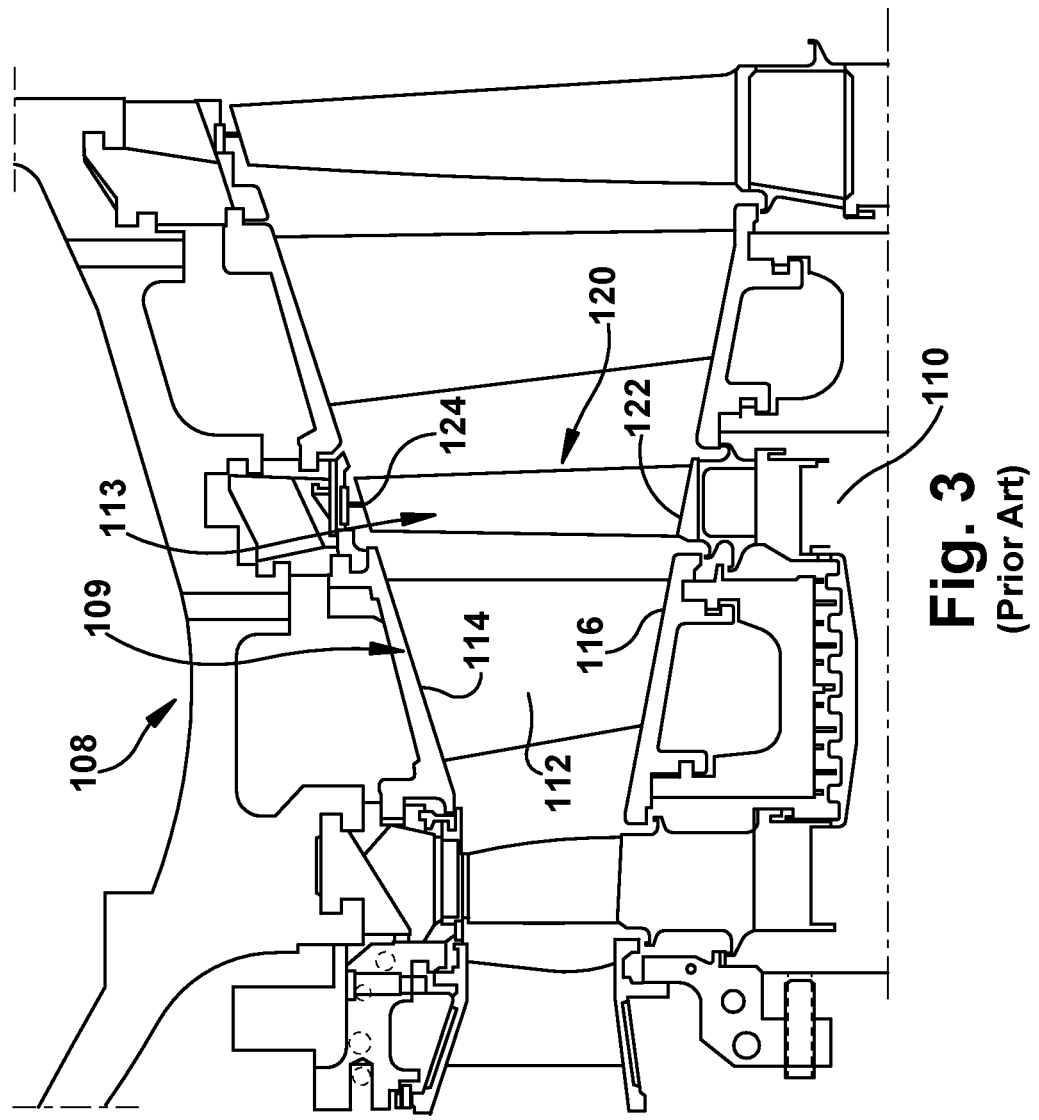
FIG. 3 shows a cross-sectional view of an illustrative gas turbine assembly with a three stage nozzle that may be used with the gas turbine system in FIG. 2.

FIG. 3 shows a cross-sectional view of an illustrative turbine assembly 108 of turbomachine 100 (FIG. 2) with a three stage nozzle that may be used with the gas turbine system in FIG. 2. Turbine assembly 108 includes a row of blades 109 coupled to a stationary casing of turbomachine 100 and axially adjacent another row of blades 113. Here, row of blades 109 includes stationary blades or vanes 112. A vane 112 may be held in turbine assembly 108 by a radially outer platform 114 and a radially inner platform 116. Row of blades 113 in turbine assembly 108 includes rotating blades 120 coupled to rotor 110 and rotating with the rotor. Rotating blades 120 may include a radially inward platform 122 (at root of blade) coupled to rotor 110 and a radially outward tip shroud 124 (at tip of blade). As used herein, the term "blade" shall refer collectively to stationary vanes or blades 112 and rotating blades 120, unless otherwise stated.

Figure 4:
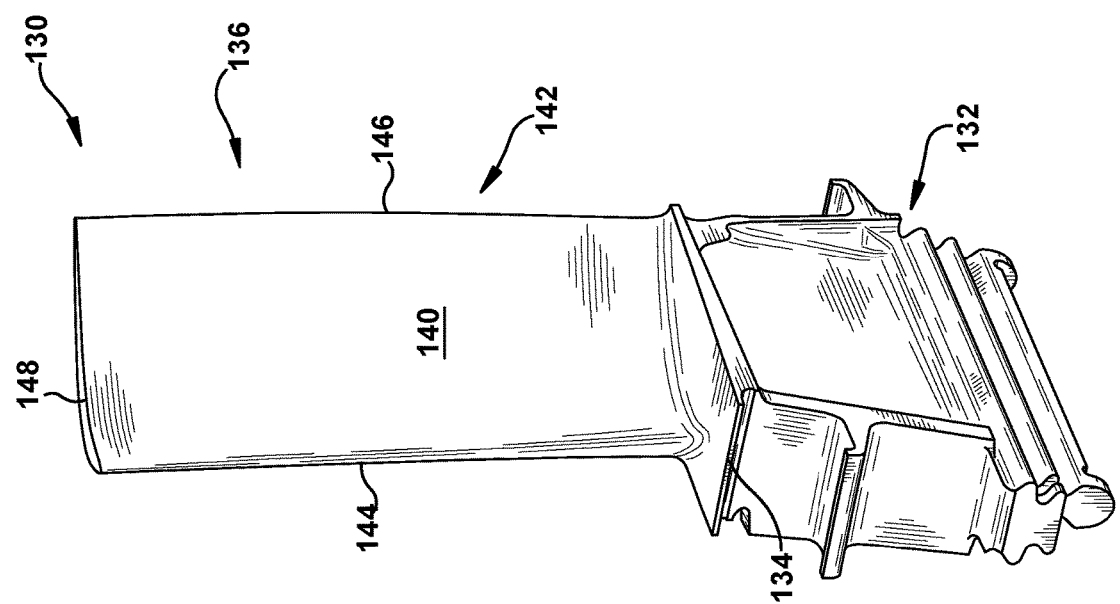
FIG. 4 shows a perspective view of a turbine rotor blade of the type in which embodiments of the present disclosure may be employed.

FIG. 4 is a perspective view of a turbine rotor blade 130 of the type in which embodiments of the present disclosure may be employed. Turbine rotor blade 130 includes a root 132 by which rotor blade 130 attaches to rotor 110 (FIG. 3). Root 132 may include a dovetail configured for mounting in a corresponding dovetail slot in the perimeter of the rotor disc. Root 132 may further include a shank that extends between the dovetail and a platform 134, which is disposed at the junction of airfoil 136 and root 132 and defines a portion of the inboard boundary of the flow path through turbine 100. It will be appreciated that airfoil 136 is the active component of rotor blade 130 that intercepts the flow of working fluid and induces the rotor disc to rotate. While the blade of this example is a turbine rotor blade 130, it will be appreciated that the present disclosure also may be applied to other types of blades within turbine engine 100, including turbine stator blades 112 (FIG. 3) (vanes). It will be seen that airfoil 136 of rotor blade 130 includes a concave pressure side (PS) outer wall 140 and a circumferentially or laterally opposite convex suction side (SS) outer wall 142 extending axially between opposite leading and trailing edges 144, 146 respectively. Sidewalls 140 and 142 also extend in the radial direction from platform 134 to an outboard tip 148. (It will be appreciated that the application of the present disclosure may not be limited to turbine rotor blades, but may also be applicable to stator blades (vanes). The usage of rotor blades in the several embodiments described herein is merely illustrative unless otherwise stated.)

Figure 5:
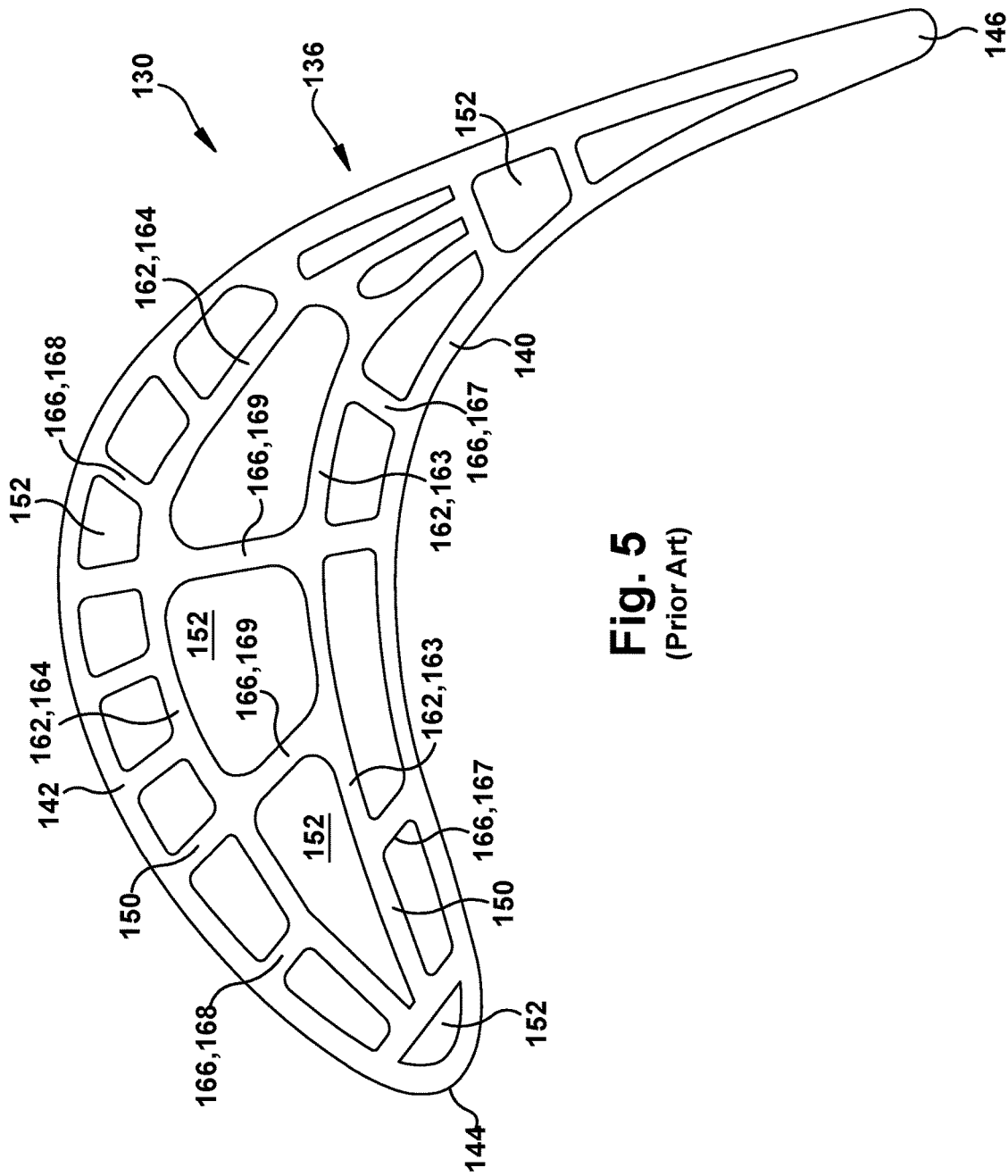
FIG. 5 shows a cross-sectional view of a turbine rotor blade having an inner wall or rib configuration according to conventional arrangement.
Figure 6:
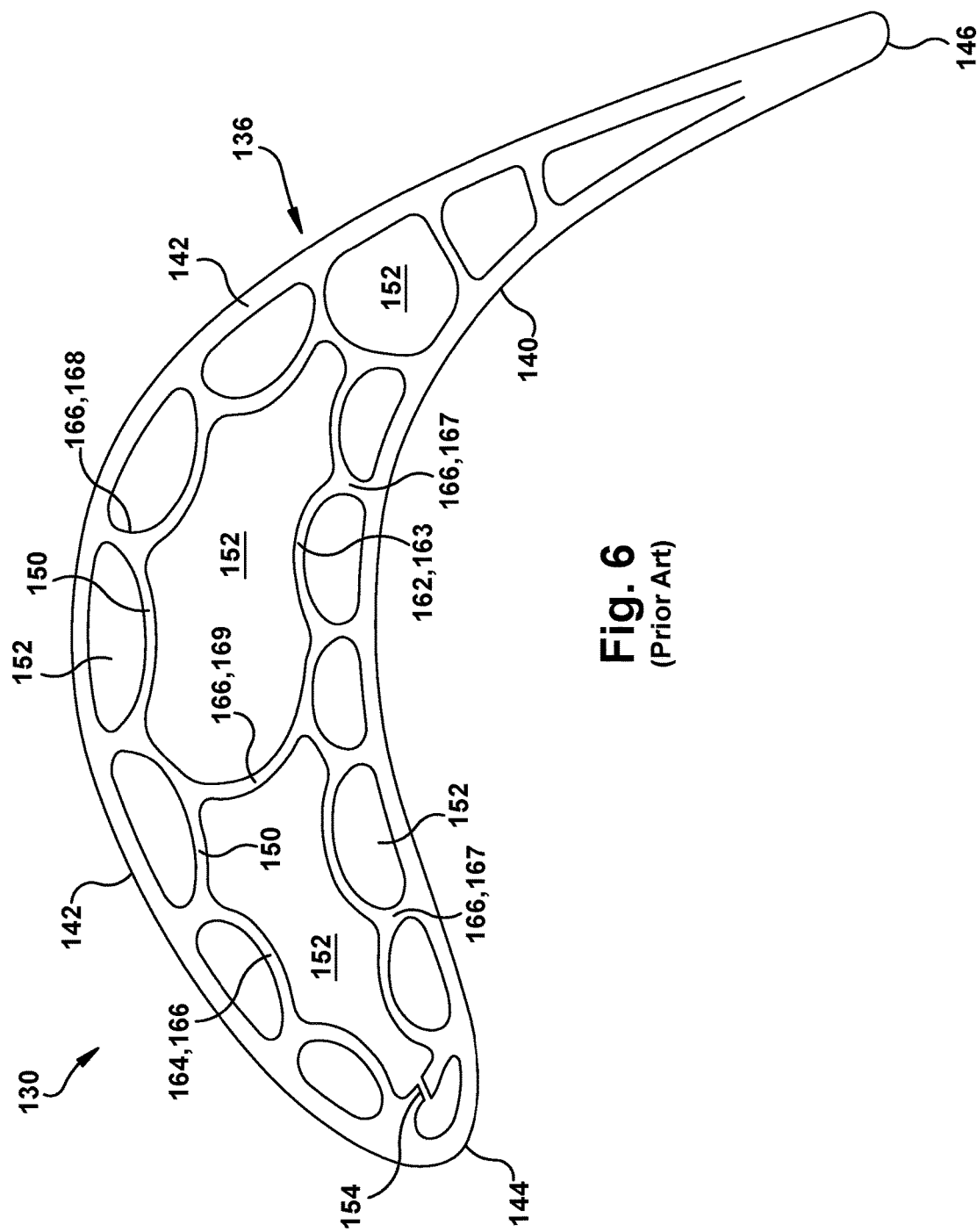
FIG. 6 shows a cross-sectional view of a turbine rotor blade having a wavy profile inner wall configuration according to conventional arrangement.

FIGS. 5 and 6 show cross-sectional views of two example internal wall constructions as may be found in a rotor blade airfoil 136 having a conventional arrangement. As indicated, an outer surface of airfoil 136 may be defined by a relatively thin pressure side (PS) outer wall 140 and suction side (SS) outer wall 142, which may be connected via a plurality of radially extending and intersecting ribs 150. Ribs 150 are configured to provide structural support to airfoil 136, while also defining a plurality of radially extending and substantially separated flow passages 152. Typically, ribs 150 extend radially so to partition flow passages 152 over much of the radial height of airfoil 136, but the flow passage may be connected along the periphery of the airfoil so to define a cooling circuit. That is, flow passages 152 may fluidly communicate at the outboard or inboard edges of airfoil 136, as well as via a number of smaller crossover passages 154 or impingement apertures (latter not shown) that may be positioned therebetween. In this manner certain of flow passages 152 together may form a winding or serpentine cooling circuit. Additionally, film cooling ports (not shown) may be included that provide outlets through which coolant is released from flow passages 152 onto an outer surface of airfoil 136.

Ribs 150 may include two different types, which then, as provided herein, may be subdivided further. A first type, a camber line rib 162, is typically a lengthy rib that extends in parallel or approximately parallel to the camber line of the airfoil, which is a reference line stretching from a leading edge 144 to a trailing edge 146 that connects the midpoints between pressure side outer wall 140 and suction side outer wall 142. As is often the case, the illustrative conventional configuration of FIGS. 5 and 6 include two camber line ribs 162, a pressure side camber line rib 163, which also may be referred to as the pressure side outer wall given the manner in which it is offset from and close to the pressure side outer wall 140, and a suction side camber line rib 164, which also may be referred to as the suction side outer wall given the manner in which it is offset from and close to the suction side outer wall 142. As mentioned, these types of arrangements are often referred to as having a "four-wall" configuration due to the prevalent four main walls that include two outer walls 140, 142 and two camber line ribs 163, 164. It will be appreciated that outer walls 140, 142 and camber line ribs 162 may be formed using any now known or later developed technique, e.g., via casting or additive manufacturing as integral components.

The second type of rib is referred to herein as a transverse rib 166. Transverse ribs 166 are the shorter ribs that are shown connecting the walls and inner ribs of the four-wall configuration. As indicated, the four walls may be connected by a number of transverse ribs 166, which may be further classified according to which of the walls each connects. As used herein, transverse ribs 166 that connect pressure side outer wall 140 to pressure side camber line rib 163 are referred to as pressure side transverse ribs 167. Transverse ribs 166 that connect suction side outer wall 142 to suction side camber line rib 164 are referred to as suction side transverse ribs 168. Transverse ribs 166 that connect pressure side camber line rib 163 to suction side camber line rib 164 are referred to as center transverse ribs 169. In general, the purpose of any internal configuration in an airfoil 136 is to provide efficient near-wall cooling, in which the cooling air flows in channels adjacent to outer walls 140, 142 of airfoil 136. It will be appreciated that near-wall cooling is advantageous because the cooling air is in close proximity of the hot outer surfaces of the airfoil, and the resulting heat transfer coefficients are high due to the high flow velocity achieved by restricting the flow through narrow channels.

As shown in one example in FIG. 6, one approach employs certain curving or bubbled or sinusoidal or wavy internal ribs (hereinafter "wavy ribs") that alleviate imbalanced thermal stresses that often occur in the airfoil of blades such as turbine blades. These structures reduce the stiffness of the internal structure of airfoil 136 so to provide targeted flexibility by which stress concentrations are dispersed and strain off-loaded to other structural regions that are better able to withstand it. This may include, for example, off-loading stress to a region that spreads the strain over a larger area, or, perhaps, structure that offloads tensile stress for a compressive load, which is typically more preferable. In this manner, life-shortening stress concentrations and strain may be avoided.

In accordance with embodiments of the disclosure, at least portions of outer walls 140, 142 and an internal rib 262 (FIGS. 7-15) are configured to include corrugated surfaces to improve cooling efficiency and external corrugated surfaces to improve wake mixing. In one embodiment, shown in partially cross-sectional, perspective views in FIGS. 7-8, the disclosure provides a blade 200 for turbomachine 100 (FIG. 2) including an airfoil body 202 defined by a concave pressure side outer wall 204 and a convex suction side outer wall 206. Outer walls 204, 206 connect along a leading edge 208 and a trailing edge 210 and, therebetween, form at least one radially extending chamber 212 for receiving the flow of a coolant. Airfoil body 202 thus has an outer surface 220 (including outer surfaces of outer wall(s) 204, 206) and an inner surface 222 facing radially extending chamber 212.

Figure 7:
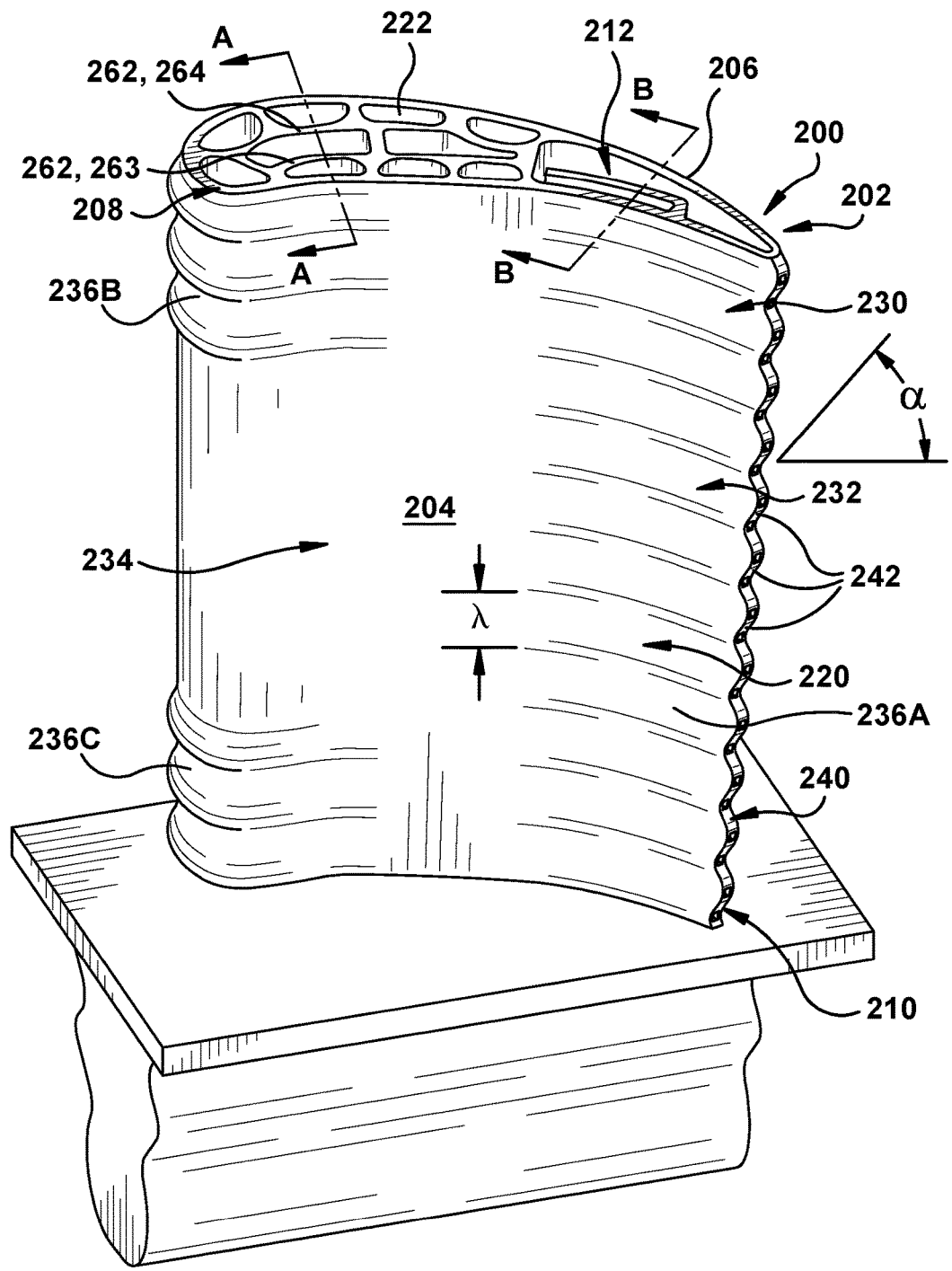
FIGS. 7 and 8 show a partially cross-sectioned, perspective view of a blade according to embodiments of the disclosure.
Figure 8:
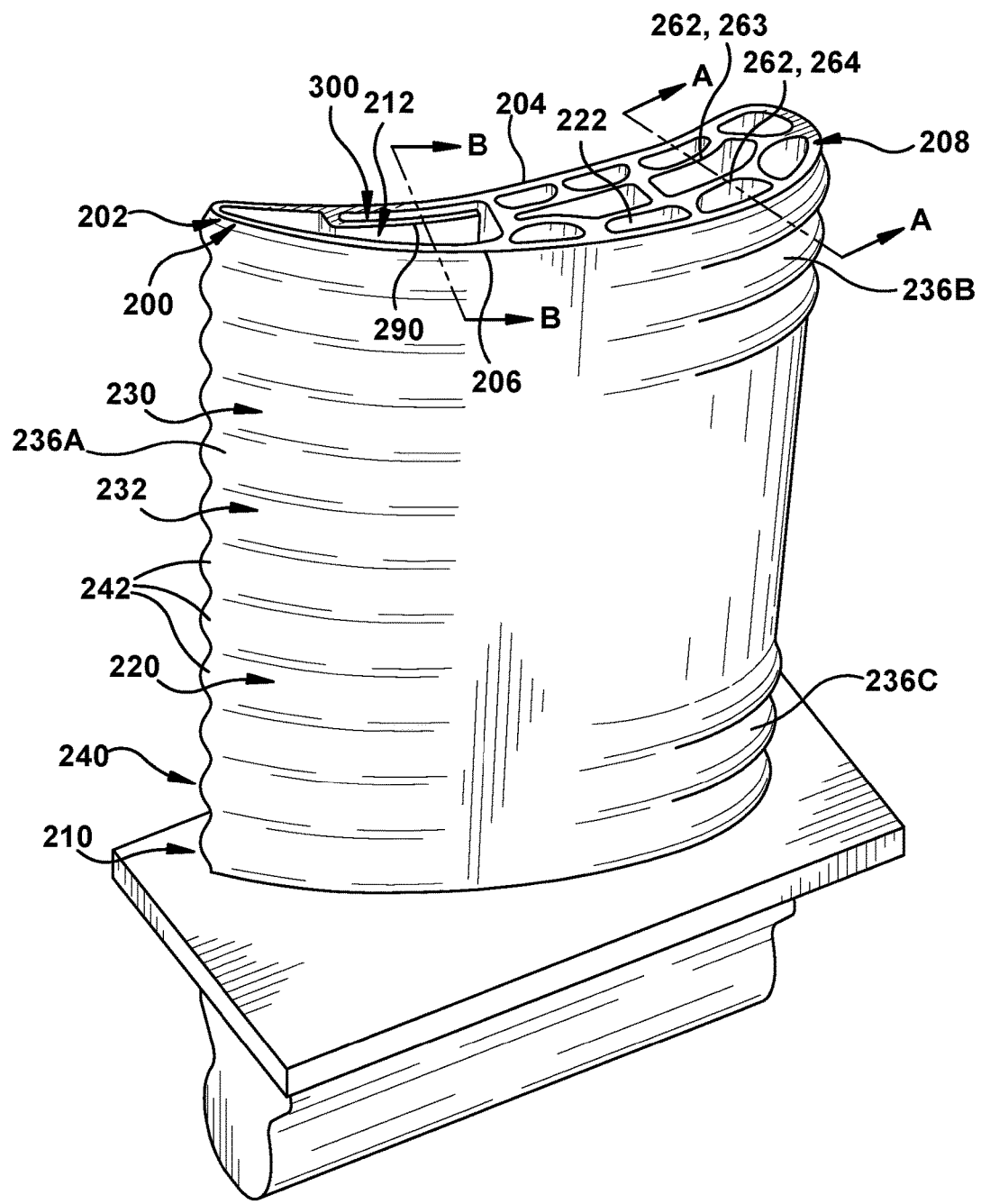

In contrast to conventional blades, blade 200 includes a (first) corrugated surface 230 on at least a portion 232 of outer surface 220. "Corrugated surfaces" as used herein may take any form having alternating ridges and grooves. In the embodiment of FIGS. 7-8, portion 232 that includes corrugated surface 230 may include a number of sections 236A, B and C. In one embodiment, section 236A of corrugated surface 230 extends from trailing edge 210 towards leading edge 208 on both concave pressure side outer wall 204 and convex suction side outer wall 206. However, it may extend on only one wall 204, 206, if desired. In one embodiment, section 236A of corrugated surface 230 eventually fades to a smooth surface 234 just aft of leading edge 208. That is, section 236A of portion 232 of outer surface 222 of airfoil body 202 extends only partially along at least one of concave pressure side outer wall 204 and convex suction side outer wall 206 from trailing edge 210 towards leading edge 208. However, section 236A of portion 232 may extend the entire length of one or both outer walls 204, 206 from trailing edge 210 to leading edge 208, if desired.

Portion 23s may include a second section 236B extending from leading edge 208 partially towards trailing edge 210, and a third section 236C, radially spaced from second section 236B, extending from leading edge 208 partially towards trailing edge 210. In the embodiment shown, second section 236B and third section 236C would be adjacent inner and outer platforms (116, 114 or 122 (FIG. 3) or tip shroud 124 (FIG. 3), as the case may be, but that is not necessary in all instances as they can be radially space therefrom.

In any of the FIGS. 7 and 8 embodiments, trailing edge 210 may optionally include a crenulated or serrated edge 240 (hereafter "crenulated trailing edge 240") including a plurality of chevrons 242. "Chevrons" 242, as used herein, are defined as triangular serration, sinusoidal or undulating planform changes that are employed along at least a portion of trailing edge 210. While crenulated trailing edge 240 has been illustrated in the form of a serrated edge having a number of spaced chevrons, the edge may include any form of serration, notches, projections, scallops, etc. Corrugated surface(s) 230 (portion 232 with section(s) 236A, B and/or C) and/or crenulated trailing edge 240 act to improve wake mixing, as will be described in greater detail herein.

Figure 9:
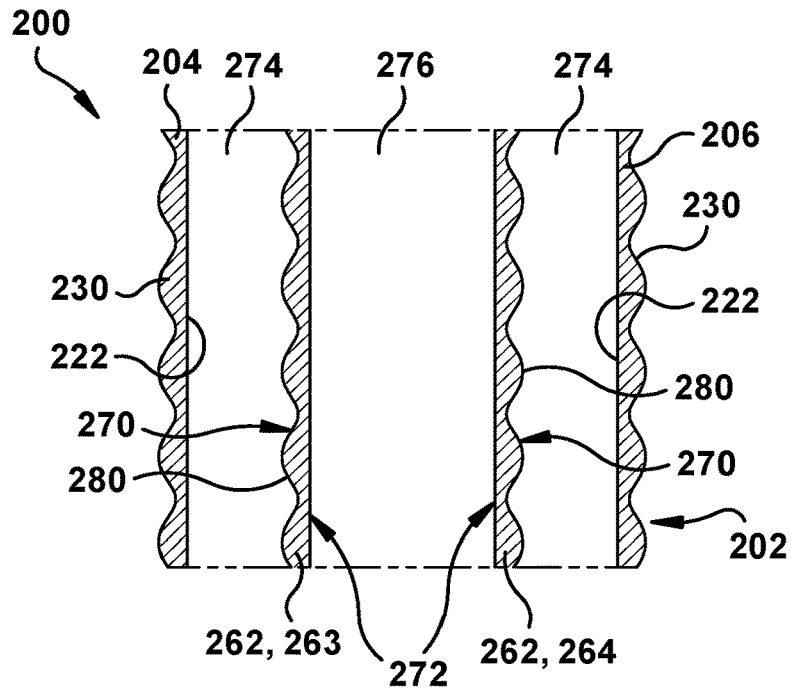
FIGS. 9-11 show cross-sectional views of various forms of a rib according to an embodiment of the disclosure.
Figure 10:
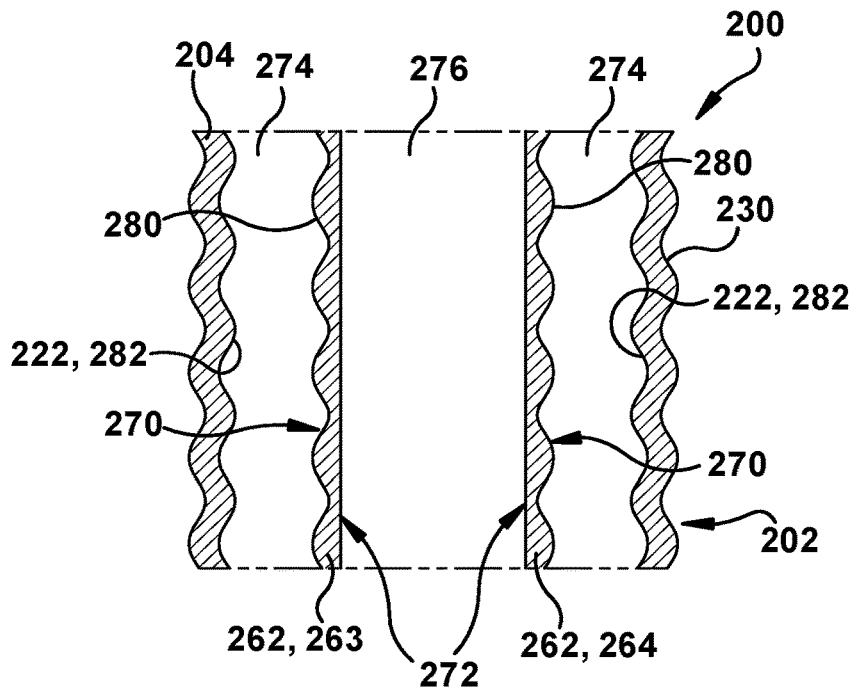
Figure 11:
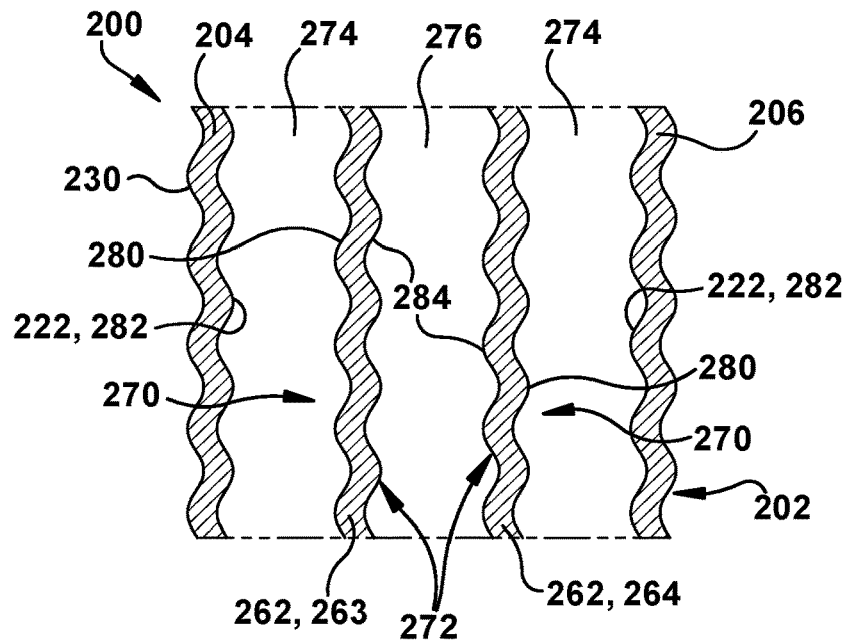

As shown in a cross-sectional views in FIGS. 9-11, blade 200 may also include a (second) corrugated surface 280 on one or more internal ribs, each of which partitions radially extending chamber 212 in one way or another.

FIGS. 9-11 shows a cross-sectional view along line A-A in FIGS. 7-8 showing a rib 262 partitioning radially extending chamber 212. As shown in FIG. 9, rib 262 includes a first side 270 and an opposing second side 272 with first side 270 facing outwardly towards outer wall 204 or 206. In the example of FIGS. 7-9, rib 262 may include a form of rib that partitions radially extending chamber 212 into a first passage 274 on first side 270 of rib 262 facing concave pressure side outer wall 204 or convex suction side outer wall 206 (both in FIG. 9 because of cross-section), and an adjacent second passage 276 on second side 272 of rib 262. In the example shown, rib 262 may take the form of at least a portion of any camber line rib 263, 264, described herein. It is emphasized, however, rib 262 according to this embodiment may include any internal rib that partitions radially extending chamber 212 into passages 274, 276, e.g., any camber line rib, any transverse rib 166 (FIGS. 5-6), etc. Also, it is emphasized that the teachings of the disclosure need not be applied to both camber line ribs 263, 264 at the same time.

As shown in FIG. 9, in accordance with embodiments of the disclosure, a corrugated surface 280 may be provided on at least a portion of at least one of first side 270 and second sides 272 of rib 262 (both shown in FIG. 9). As used herein, "at least a portion" can include any radial amount, any axial amount or combinations thereof of a rib or surface, e.g., a portion or all, regardless of what may be shown in the drawings. In FIG. 9, corrugated surface 280 is on first side 270 of rib 262, i.e., facing outwardly toward outer wall 204 or 206.

As shown in another embodiment in the cross-sectional view in FIG. 10, blade 200 may also optionally include a (third) corrugated surface 282 on at least a portion of an inner surface 222 of airfoil body 202, i.e., on all or part of inner surface 222 of one or more outer walls 204, 206 (both in FIG. 9). Corrugated surface 282 may parallel corrugated surface 230, i.e., where section(s) 236A-C of portion 232 are provided. As used herein, relative to corrugated surfaces, "parallel" indicates the two respective corrugated surfaces match such that wherever one corrugated surface exists on one surface of the rib or wall, the other corrugate surface exists on the opposing side surface of the rib or wall to maintain the thickness of the rib or wall along a length thereof. Some variance in the parallelism may be possible in, for example, transition areas between adjacent structures, transition areas where corrugated surfaces stop, etc. Further, the "parallelism" described herein may be understood to be that possible within now known or later developed additive manufacturing or casting tolerances. In the instant example, wherever corrugated surface 230 exists on outer surface 220, corrugate surface 282 exists on inner surface 222. Further, where corrugated surface 230 extends outwardly, e.g., relative to radial passage 212, corrugated surface 282 also extends outwardly, maintaining a thickness of outer wall(s) 204, 206. In one embodiment, corrugated surface 280 parallels corrugated surface 282 to maintain substantially constant spacing between opposing walls of passages 274.

FIG. 11 shows a cross-sectional view of another embodiment in which blade 200 may also optionally include a (fourth) corrugated surface 284 on second side 272 of rib 262. As illustrated, corrugated surface 284 parallels corrugated surface 280. That is, wherever corrugated surface 280 exists on first side 270, corrugated surface 284 exists on second side 272. Further, where corrugated surface 280 extends outwardly, e.g., relative to radial passage 212, corrugated surface 284 also extends outwardly, maintaining a thickness of rib 262. Again, some variance in the parallelism may be possible in, for example, transition areas between adjacent structures.

While rib 262 has been described relative to a wavy profile rib configuration, as shown generally in FIGS. 6-8, the teachings of the disclosure can be applied to any form of internal rib, e.g., straight (as in FIG. 5) or curved.

Figure 12:
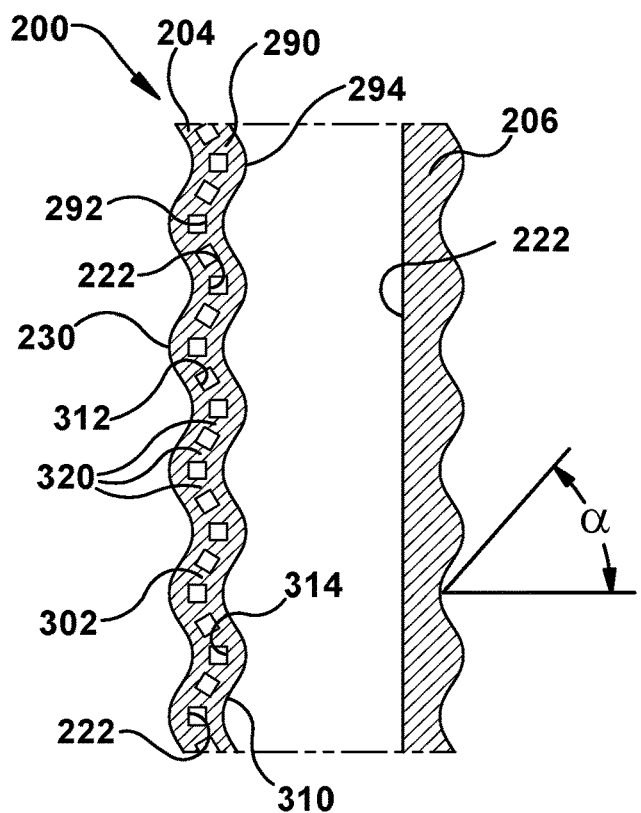
FIGS. 12-16 show cross-sectional views of various forms of a rib according to another embodiment of the disclosure.
Figure 13:
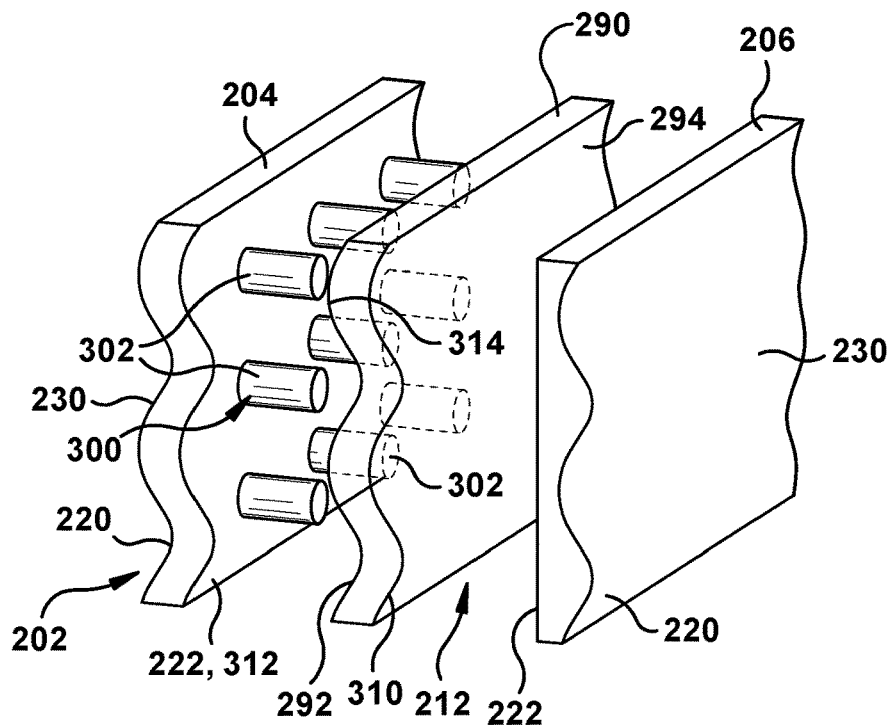
Figure 14:
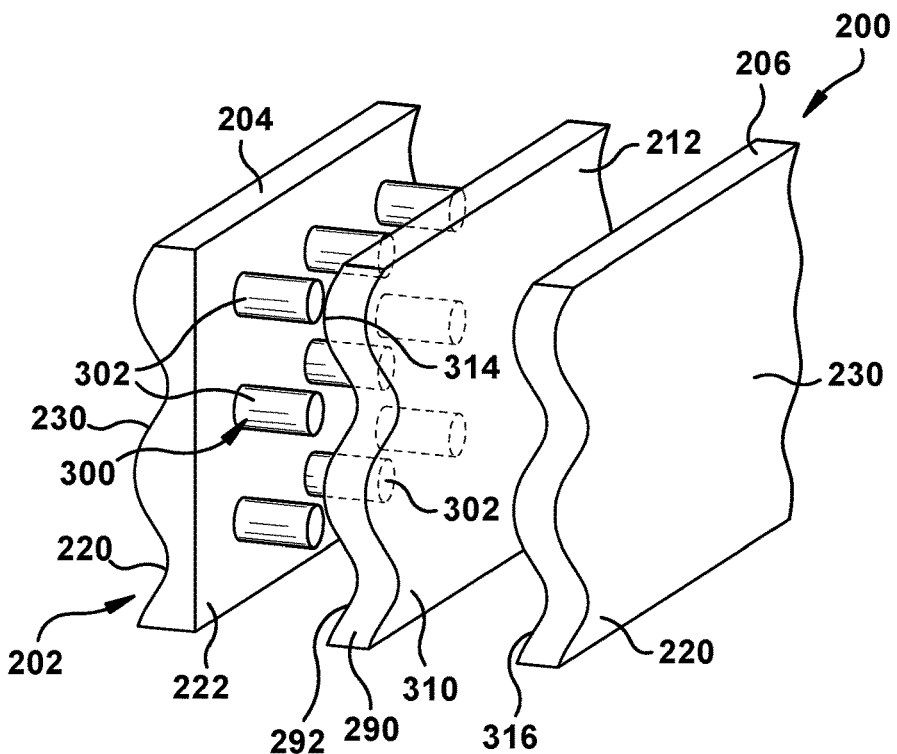
Figure 15:
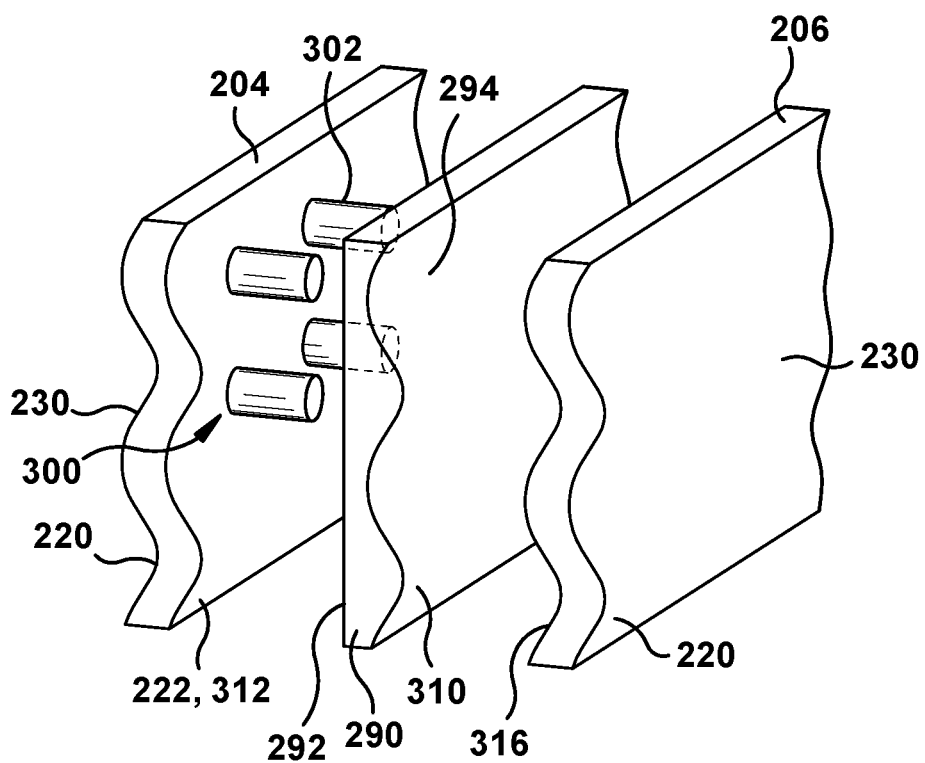
Figure 16:
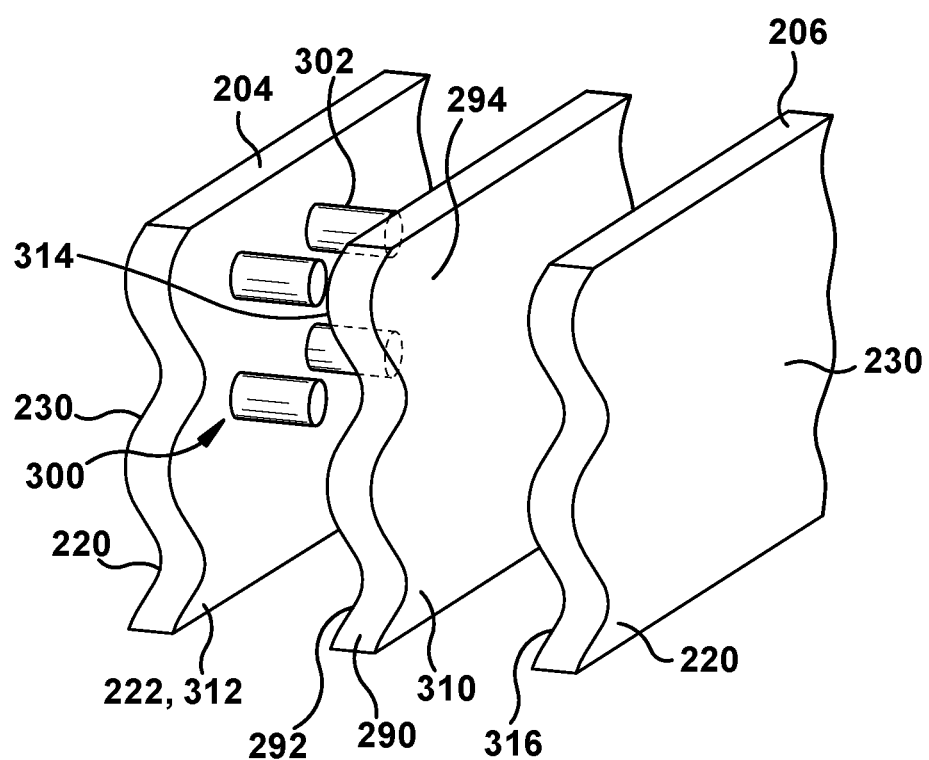

Referring to FIGS. 7 and 8 in combination with FIGS. 12 and 13, in another embodiment, a rib 290 may partition radially extending chamber 212. FIG. 12 shows a cross-sectional view along line B-B in FIGS. 7 and 8 of rib 290, and FIG. 13 shows a partial perspective view of rib 290. In this embodiment, rib 290 does not form a passage on either side thereof; rather, rib 290 extends as a fin that partitions radially extending chamber 212. As shown in FIGS. 12 and 13, rib 290 may include a first side 292 facing concave pressure side outer wall 204 (as shown) or convex suction side outer wall 206, and a second side 294 facing radially extending chamber 212. A pin bank 300 may be positioned on first side 292 between rib 290 and concave pressure side outer wall 204 (as shown) or convex suction side outer wall 206. As understood in the field, pin bank 300 may include an array of pins 302 extending between first side 292 of rib 290 and inner surface 222 of outer wall 204 (shown) or 206. Coolant flows about pins 302 to assist heat transfer. A corrugated surface 310 may be on at least a portion of second side 294 of rib 290. Another corrugated surface 312 may be positioned on inner surface 222 of airfoil body 202. Corrugated surface 312 parallels corrugated surface 230 on outer surface 220 of outer wall 204 or 206. Here, pin bank 300 couples to corrugated surface 312. FIGS. 12 and 13 also show an optional corrugated surface 314 on at least a portion of first side 292 of rib 290. Here, pin bank 300 also couples to corrugated surface 314. FIGS. 14 and 15 show a perspective views illustrating how only one each of corrugated surfaces 312, 314 may be employed: no corrugated surface 312 in FIG. 14, and no corrugated surface 314 in FIG. 15. FIGS. 14 and 15 also show the option of providing a corrugated surface 316 on internal surface 222 of concave suction side wall 204 or convex suction side wall 206 (shown) that does not include pin bank 300 and rib 290. Corrugated surface 316 parallels corrugated surface 230 on outer surface 220 of outer wall 204 or 206 (shown). FIG. 16 shows another embodiment which four corrugated surfaces 230, 312, 310 and 314 are provided in the area in which pin bank 300 is positioned. Corrugated surfaces on opposing sides of a wall or a rib may parallel each other, as may corrugated surfaces that face one another. In FIG. 16, pin bank 300 couples to corrugated surfaces 312 and 314. While rib 290 and pin bank 300 have been illustrated in FIGS. 12-16 as connecting to concave pressure side wall 204, it is understood that it may be applied to convex suction side outer wall 206 in a similar fashion. In addition, it is also understood that, space within radially extending chamber 212 permitting, two ribs 290 may be employed, one for each outer wall 204, 206.

The rib embodiments of FIGS. 9-16 can be used separately, i.e., by themselves within a given blade 200, or may be used together, as shown in FIGS. 7 and 8. That is, both ribs 262 and 290 may be employed to partition radially extending chamber 212, as described herein. Where both are used, one rib, e.g. rib 290, may be positioned at a location distal (distanced) from the other rib, e.g., rib 262, providing for the advantages of corrugated internal ribs in different locations within the overall rib configuration.

With further reference to FIGS. 7 and 12, corrugated surface 230 (FIG. 7) as a representative for all corrugated surfaces described herein and crenulated trailing edge 240 (FIG. 12) is shown as having angles α relative to horizontal. In accordance with embodiments of the disclosure, angle α is no greater than 45°. That is, each corrugated surface and crenulated trailing edge 240 include surfaces extending at no greater than 45° relative to horizontal. As will be appreciated, such angling is a current limitation of now known additive manufacturing techniques. In other embodiments, for example, where blade 200 is manufactured by a casting process, angle α is not limited to 45° and may be greater than or less than 45°.

FIGS. 7-16 show corrugated surface(s) as sinusoidal with identical rounded ridges and grooves of equal amplitude (height) and wavelength λ (labeled in FIG. 7 only) between a root (platform end 122 (FIG. 3)) and a tip (shroud end 1140 (FIG. 3) of blade 200. It is emphasized that corrugated surfaces may take a variety of alternative forms. For example, corrugated surface(s) may be: sinusoidal and have rounded ridges and grooves of different wavelength λ (FIG. 7 only) and/or amplitude (height from base surface); sinusoidal and have rounded ridges and grooves of equal wavelength λ, but inconsistent amplitude (even to a point, as shown in FIGS. 7-8, of being discontinuous between a root (platform end 122 (FIGS. 7 and 8, near leading edge 208)) and a tip (shroud end 124 (FIG. 3) of blade 200); sinusoidal and have rounded ridges and grooves of equal amplitude, but inconsistent wavelengths λ; and with different shape corrugations. The amplitude, wavelength λ, layout and/or waveforms may change in any way required to attain the desired external wake mixing and/or internal cooling. While various embodiments of corrugated surface(s) have been described herein, it is emphasized that a large variety of alternatives are also possible and that any can be combined in any fashion. Further, corrugated surface(s) can be varied in a number of ways including but not limited to: amplitude, wavelength, angle of approach (relative to the rotor), angle of exiting (relative to the rotor), curvature (relative to the rotor), waveform shape, length extending forward from the trailing or leading edge, one side or both sides of the airfoil body on which provided, radial extent upon which provided (some or all, continuous or discontinuous), etc.

Figure 17:
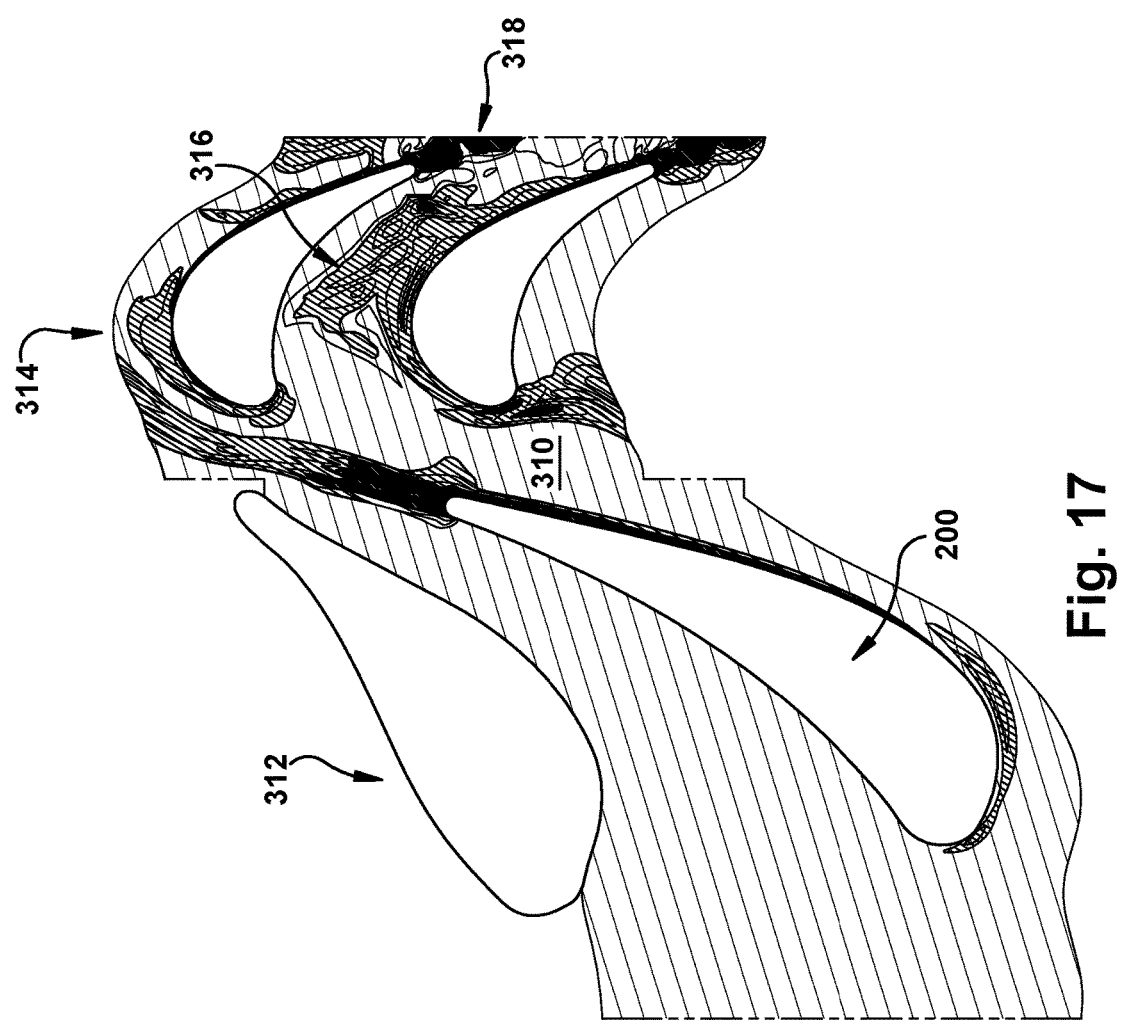
FIG. 17 shows a schematic view of an aerodynamic flow within a turbomachine using a blade according to embodiments of the disclosure.

FIG. 17 shows a schematic view of an aerodynamic flow within a turbomachine using a blade 200 according to embodiments of the disclosure. In operation, embodiments of the disclosed blade 200 act to enhance the mixing of an airfoil wake in a constant area region 310 between airfoil rows 312, 314, through the introduction of discrete vortex structures created by corrugated surface 230 (FIGS. 7-8) and/or crenulated trailing edge 240 (FIGS. 7-8). The goal of corrugated surface 230 and crenulated trailing edge 240 is to minimize the velocity deficit before the wake enters downstream blade row 314, which reduces the generation of mixing loss within downstream blade row 314: compare location 316 in FIG. 17 with location 20 in FIG. 1, and location 318 in FIG. 17 with location 22 in FIG. 1. Moving the mixing loss from within downstream blade row 314 to constant area region 310 ahead of downstream blade row 314 thus produces a net gain in efficiency. Blade 200 provides this functionality without having to reduce the strength of the wake (e.g., by reducing the diameter of the trailing edge), which is impractical due to mechanical and thermal concerns. Blade 200 also does not require increasing the space for the wake to mix before entering downstream blade row 314, which may result in a higher net loss due to friction losses associated with the longer inner and outer walls of the flowpath and creates a longer turbomachine, which increases cost and lowers power density. Blade 200 also removes the need for complex air jets to create the mixing.

In addition, corrugated surfaces on internal ribs and/or walls provides improved cooling compared to conventional linear ribs/walls without adding weight. The improved cooling can lead to longer part life.

Referring to FIGS. 18-38, an alternative embodiment of the disclosure in which attributes of the herein described blade can be applied to a preexisting turbine rotor blade or a preexisting turbine vane by use of a coupon are provided. The coupon can be applied in a cutout of the airfoil body of the preexisting turbine rotor blade or turbine vane. The preexisting blade can be used or newly manufactured, but in any event does not include the corrugated surface(s), and may not include all or any of the internal cooling structures of blade. The coupon described herein is coupled in a cutout in a leading edge or a trailing edge of the preexisting blade to provide corrugated surface(s) on at least a portion of an outer surface thereof. Thus, the coupon can be added to provide at least some of the wake mixing as described herein. In addition, the coupon can be internally structured to include a number of advantageous cooling structures, e.g., flow passages, impingement cooling structures, pin banks, etc., to match that provided in the preexisting airfoil body or, advantageously, add the cooling structures where not previously present in the preexisting blade, thus providing at least some of the cooling features described relative to blade 200.

Figure 38:
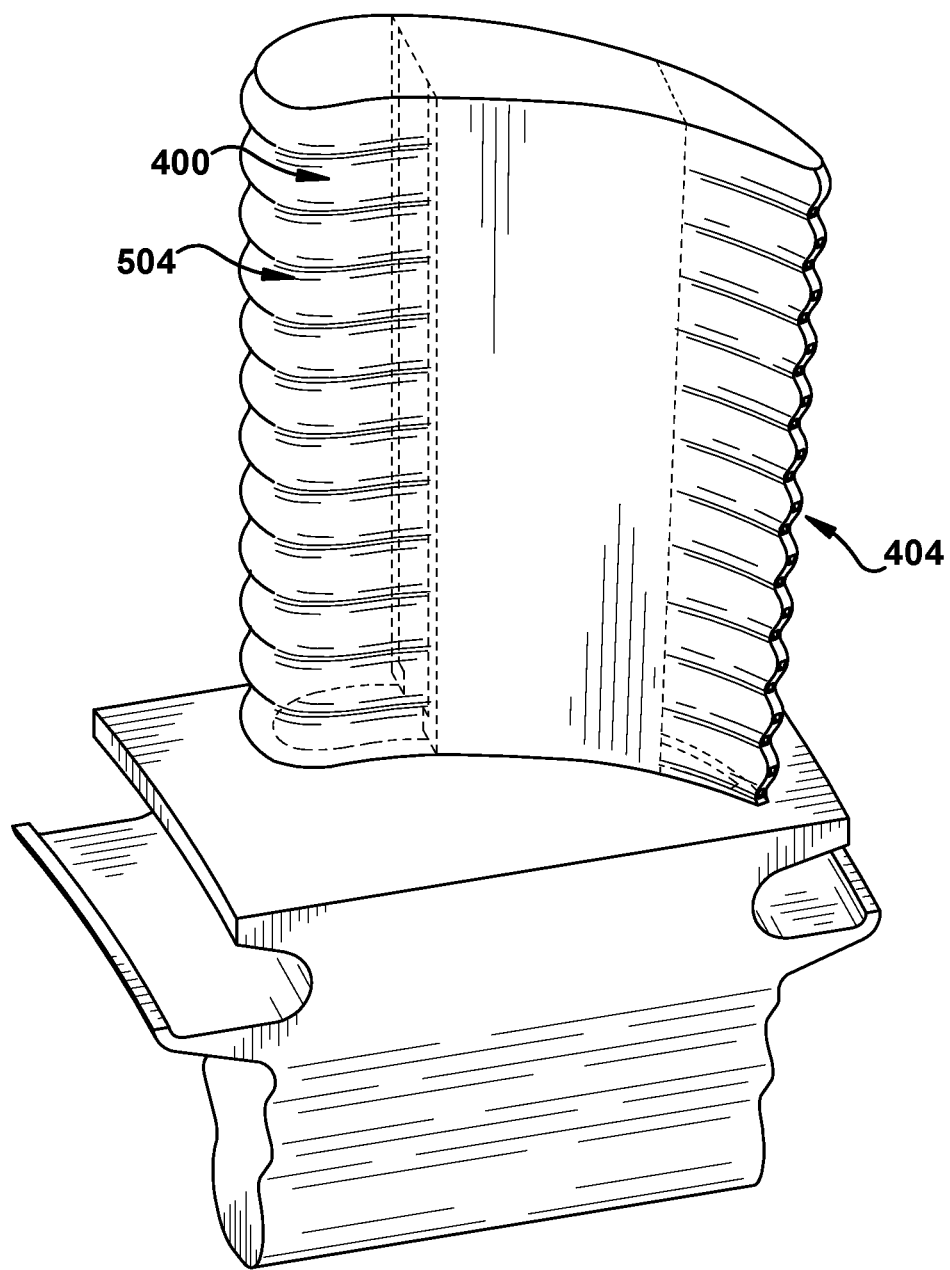
FIG. 38 shows a perspective view of a turbine rotor blade including coupons having corrugated surfaces for a leading and a trailing edge according to embodiments of the disclosure.
Figure 39:
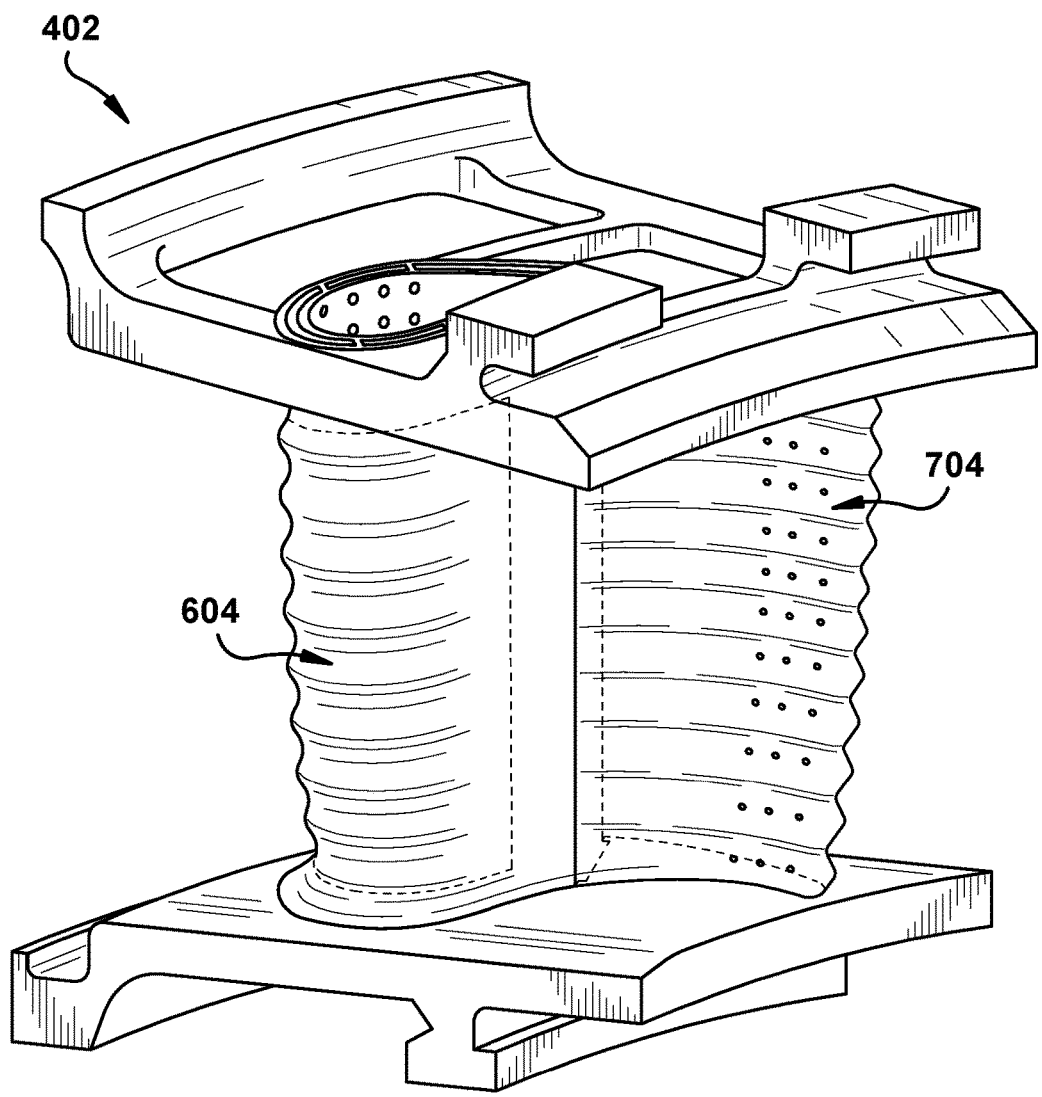
FIG. 39 shows a perspective view of a turbine vane including coupons having corrugated surfaces for a leading and a trailing edge according to embodiments of the disclosure.

FIGS. 18-31 show embodiments of a coupon 404, 504 as applied to a turbine rotor blade 400, and FIGS. 32-37 show embodiments of a coupon 604, 704 as applied to a turbine vane (stationary blade) 402. In any of the embodiments, coupon 404, 504, 604, 704 replaces a cutout of a predetermined area in an airfoil body of a preexisting turbine blade. The airfoil body has a leading edge, a trailing edge and a smooth outer surface. The cutout can be made within the leading edge and/or the trailing edge of the airfoil body. According to embodiments of the disclosure, coupon 404, 504, 604, 704 includes a corrugated surface on at least a portion of an outer surface thereof to assist in wake mixing as described herein relative to FIG. 17. While the disclosure describes each form of blade separately, i.e., turbine rotor blade and turbine vane, it is emphasized that the particular features shown and described relative to one form of blade can be equally applicable to the other form of blade. Further, teachings applied to a coupon applied to a leading edge may be applicable to a coupon applied to a trailing edge. Also, while leading edge coupons and trailing edge coupons are described separately, as shown in FIGS. 38 and 39, they can be applied simultaneously to the same blade.

Figure 18:
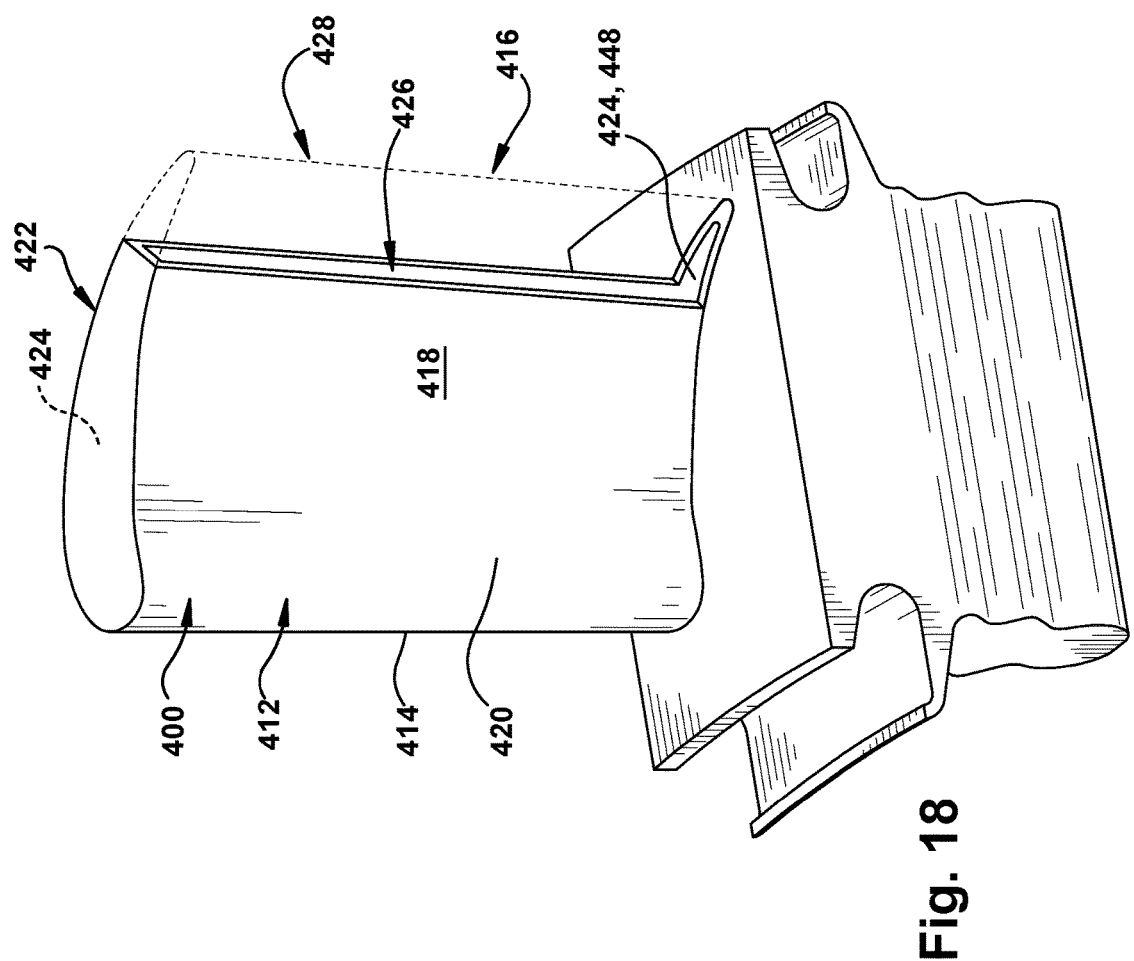

With reference to FIGS. 18-25, embodiments of a coupon 404 for use with a preexisting turbine rotor blade 400 will now be described. FIG. 18 shows a perspective view of a preexisting turbine rotor blade 400. Turbine rotor blade 400 may include external and internal structure as described relative to turbine rotor blade 130 of FIGS. 4-6. Turbine rotor blade 400 includes an airfoil body 412 having a leading edge 414, a trailing edge 416 (shown in phantom, removed) and a smooth outer surface 418. Smooth outer surface applies to both a concave pressure side outer wall 420 and a convex suction side outer wall 422 extending between leading edge 414 and trailing edge 416. As in earlier embodiments, a radially extending chamber 424 may extend between walls 420, 422. Turbine rotor blade 400 is shown with a cutout 426 positioned within at least one of leading edge 414 and trailing edge 416 (shown). As illustrated in the example in FIG. 18, cutout 426 is positioned within trailing edge 416, and removes a predetermined area 428 (shown by dashed lines) of airfoil body 412, i.e., from trailing edge 416. Cutout 426 can be removed by any now known or later developed metal cutting technique, e.g., welding torch, electrical discharge machining (EDM), laser cutting, water jet cutting, etc. As illustrated, cutout 426 includes most if not all of a radial extent of airfoil body 412. It is emphasized, however, that cutout 426 can include any portion of airfoil body 412 from which wake mixing and/or different internal cooling structure is desired.

Figure 19:
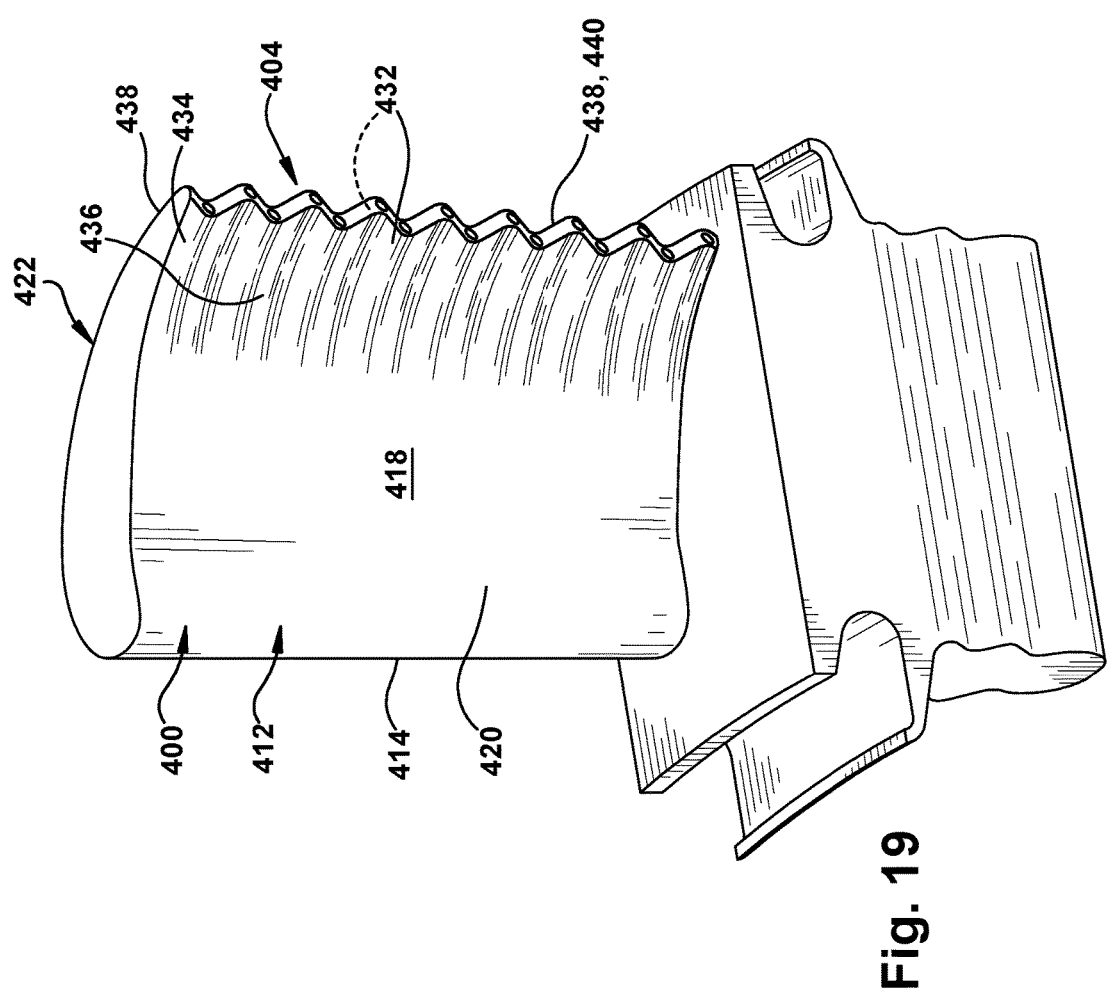

As shown in FIG. 19, coupon 404 is coupled in cutout 426 (FIG. 18) to replace predetermined area 428 (FIG. 18) of airfoil body 412. In accordance with embodiments of the disclosure, in contrast to conventional replacement edges, coupon 404 includes a first corrugated surface 432 on at least a portion of an outer surface 434 thereof. Coupon 404 includes a concave pressure side outer wall 436 configured to mate with concave pressure side outer wall 420 of airfoil body 412. Coupon 404 also includes a convex suction side outer wall 438 configured to mate with convex suction side outer wall 422 of airfoil body 412. Concave pressure side outer wall 436 and convex suction side outer wall 438 of coupon 404 couple at a (new) trailing edge 416. Coupon 404 may be coupled in cutout 426 (FIG. 18) using any now known or later developed metal coupling process, e.g., welding, brazing, laser welding, etc., which may include any finishing processing necessary to finish, e.g., smooth, the joint.

Corrugated surface 432 may extend from trailing edge 440 on one outer wall 436, 438 or both outer walls 436, 438 of coupon 404. Further, corrugated surface 432 of coupon 404 can take a variety of alternative forms. For example, corrugated surface 432 can take any of the aforementioned forms described relative to corrugated surface(s) herein, and so may be varied in a number of ways including but not limited to: amplitude, wavelength, angle of approach (relative to the rotor), angle of exiting (relative to the rotor), waveform shape, curvature (relative to the rotor), length extending forward from trailing edge 416, one side or both sides of coupon 404 on which provided, radial extent upon which provided (some or all, continuous or discontinuous (see e.g., FIGS. 23-24)), etc.

As shown in FIGS. 20-24, coupon 404 may include a number of internal cooling structures 440 to either match that provided in cutout 426, or added in coupon 404 but mating with cooling structure present in airfoil body 412. It is emphasized that the illustrations are not all inclusive of the possibilities. FIGS. 20-24, for example, show coupon 404 with a radially extending chamber 442 configured to mate with airfoil radially extending chamber 424 (FIG. 18) (or whatever part of cooling structure within airfoil body 412 is exposed by cutout 426). In this fashion, coupon 404 is provided with a first coupon coolant flow passage 446 configured to fluidly mate with an airfoil coolant flow passage 448 (FIG. 18)(exposed by cutout 426). In one embodiment, shown in FIG. 20, coupon 404 includes a pin bank 450 within first coupon coolant flow passage 446. Pin bank 450 may be positioned between concave outer wall 436 of coupon 404 and convex outer wall 438 of coupon 404. As understood in the field, pin bank 450 may include an array of pins 452 extending between outer walls 436, 438 of coupon 404. Coolant flows about pins 452 to assist heat transfer.

In FIG. 21, coupon 404 includes a plurality of flow passages 454 extending from an interior surface thereof to outer surface 434 thereof, e.g., from radially extending chamber 442 to outer surface 434. Flow passages 454 can take any path through walls 436, 438 desired.

Figure 24:
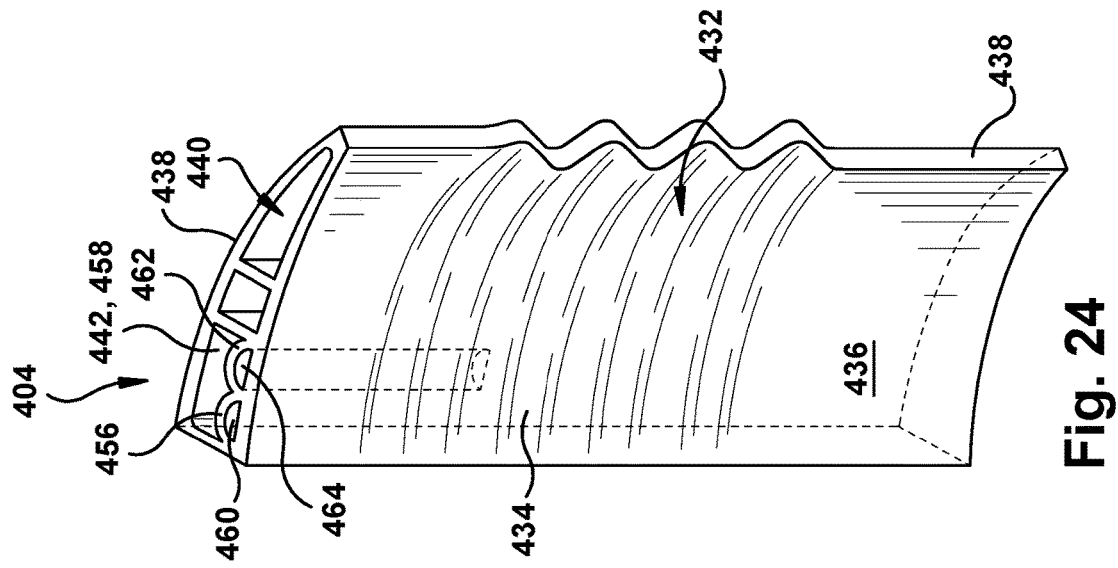
Figure 23:
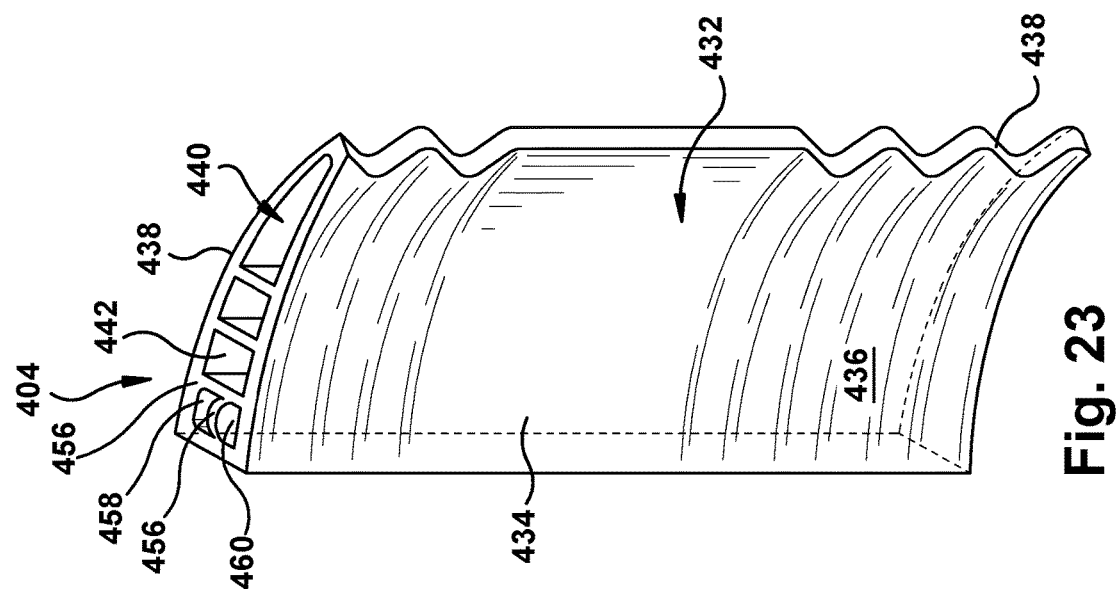

In FIGS. 22-24, a first coupon rib 456 partitions coupon radially extending chamber 442 to form a first coupon coolant flow passage 458. In FIG. 22, rib 456 is similar to rib 290 (FIG. 8) and acts as a fin within chamber 442, while in FIGS. 23 and 24, rib 456 partitions chamber 442 into a first coupon flow passage 458 and a second coupon flow passage 460 (only one labeled) on an opposing side of the rib, e.g., similar to ribs 263, 264 in FIG. 8. In FIG. 22, pin bank 450 may be positioned between concave pressure side outer wall 436 of coupon 404 (as shown) or convex suction side outer wall 438 of coupon 404 and rib 456. The preexisting turbine rotor blade may include an airfoil body 412 (FIG. 18) having an airfoil radially extending chamber 424 (FIG. 18) therein and an airfoil rib (e.g., like rib 263 in FIG. 8) partitioning airfoil radially extending chamber 424 (FIG. 18) to form an airfoil coolant flow passage therein, similar to those shown in, for example, FIG. 6. And, cutout 426 (FIG. 18) may expose the airfoil rib and the airfoil coolant flow passage in such a way that coupon 404 can be configured to mate with the airfoil rib and airfoil coolant flow passage.

In one embodiment, coupon 404 may replace cooling structure provided in cutout 426 but add corrugated surface 432. For example, coupon 404 of FIG. 23 could be used with a turbine rotor blade like that shown in FIG. 6 to provide identical cooling structures 440, but add corrugated surface 432. Alternatively, as shown in FIG. 24, coupon 404 need not have identical cooling structures 440 as those of the preexisting blade. Rather, coupon 404 may include at least one second coupon rib 462 partitioning coupon radially extending chamber 442 into at least one second coupon coolant flow passage 464. Here, second coupon flow passage(s) 464 may have a different shape than first coupon coolant flow passage 460, and may not mate with coolant flow passages exposed by cutout 426 in the preexisting blade. In the example, second coupon flow passage 464 starts part way along a radial extent of coupon 404. In this fashion, coupon 404 provides additional and/or improved cooling compared to that provided in the trailing edge removed by cutout 426, and adds corrugated surface 432 for wake mixing. It is emphasized that while a particular example of second coupon flow passage 464 has been illustrated, passage 464 can be configured in any now known or later developed arrangement that is different than that provided in the trailing edge removed by cutout 426.

As shown in FIGS. 20-22, coupon 404 may also include a crenulated trailing edge 440, similar to that described elsewhere herein, and meshing with first corrugated surface 432. As shown in FIG. 21, coupon 404 may include first coupon coolant flow passage 446 and a plurality of coolant flow passages 466 passing from first coupon coolant flow passage 446 through crenulated trailing edge 440 of the coupon.

Figure 25:
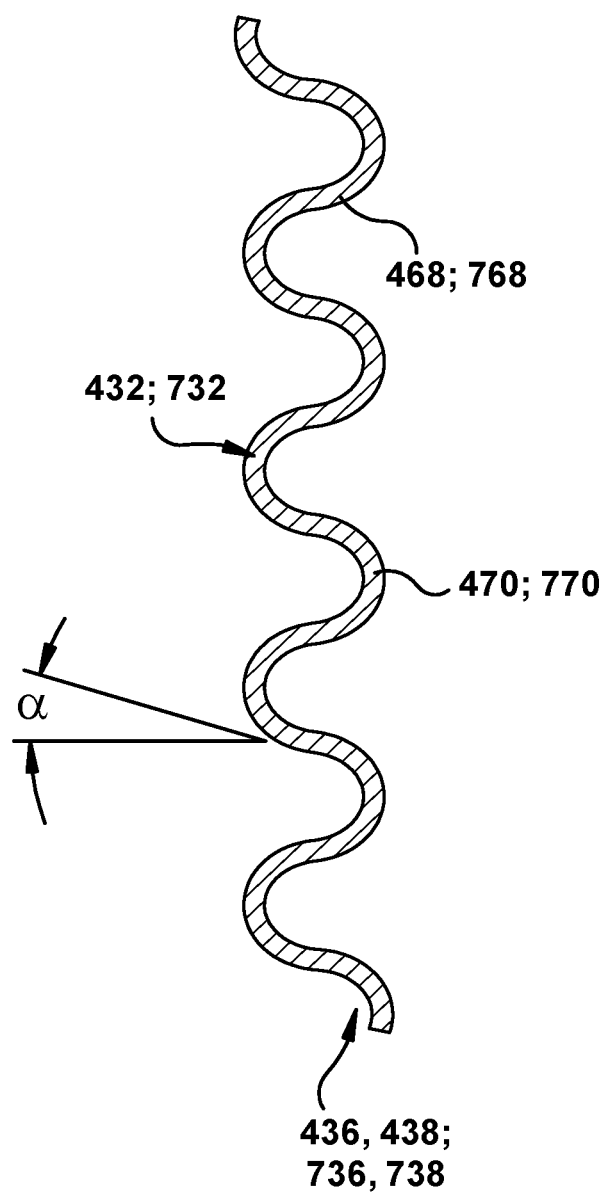

FIG. 25 shows a cross-sectional view along line A-A in FIG. 20. In any of the embodiments disclosed in FIGS. 20-24, as shown in FIG. 25, coupon 404 may include a second corrugated surface 468 on at least a portion of an internal surface 470 thereof. Second corrugated surface 468 parallels first corrugated surface 432, as described herein.

Referring to FIGS. 26-31, in another embodiment of the disclosure, turbine rotor blade 400 has a cutout removed from a leading edge, and a coupon including a corrugated surface replaces the leading edge.

Figure 26:
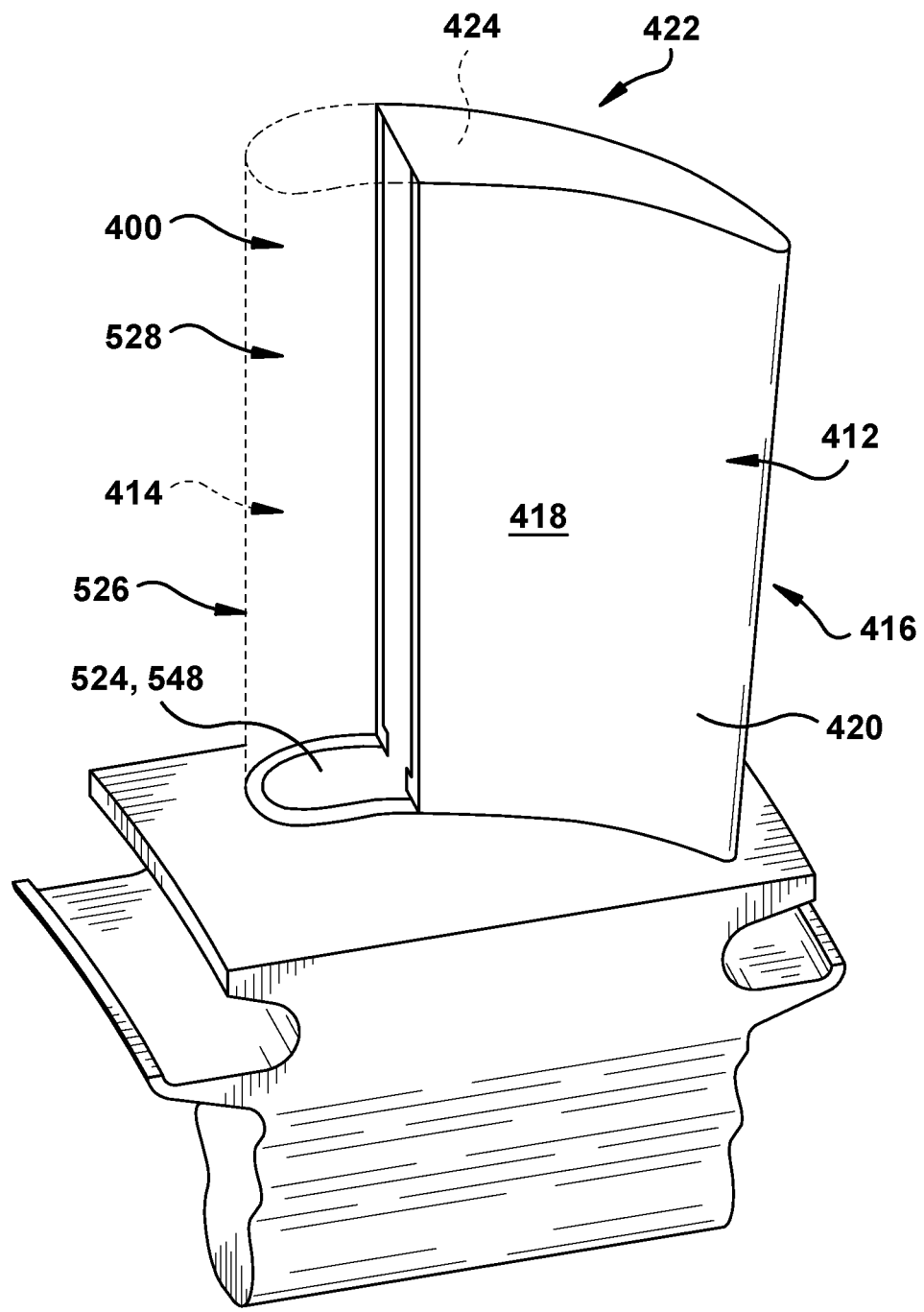

FIG. 26 shows a perspective view of a preexisting turbine rotor blade 400 identical to that of FIG. 18, except rather than cutout 426 (FIG. 18) being removed from trailing edge 416 (FIG. 18), a cutout 526 is removed from leading edge 414 (shown in phantom, removed). Airfoil body 412 otherwise has a smooth outer surface 418. Turbine rotor blade 400 may include external and internal structure as described relative to turbine rotor blade 130 of FIGS. 4-6. As explained, a radially extending chamber 424 may extend between concave pressure side outer wall 420 and convex pressure side outer wall 422. As cutout 526 is positioned within leading edge 414, it removes a predetermined area 528 (shown by dashed lines) of airfoil body 412, i.e., from leading edge 414. Cutout 526 can be removed by any now known or later developed metal cutting technique, e.g., welding torch, electrical discharge machining (EDM), laser cutting, water jet cutting, etc. As illustrated, cutout 526 includes most if not all of a radial extent of airfoil body 412. It is emphasized, however, that cutout 526 can include any portion of airfoil body 412 in which wake mixing and/or different internal cooling structure, is desired.

Figure 30:
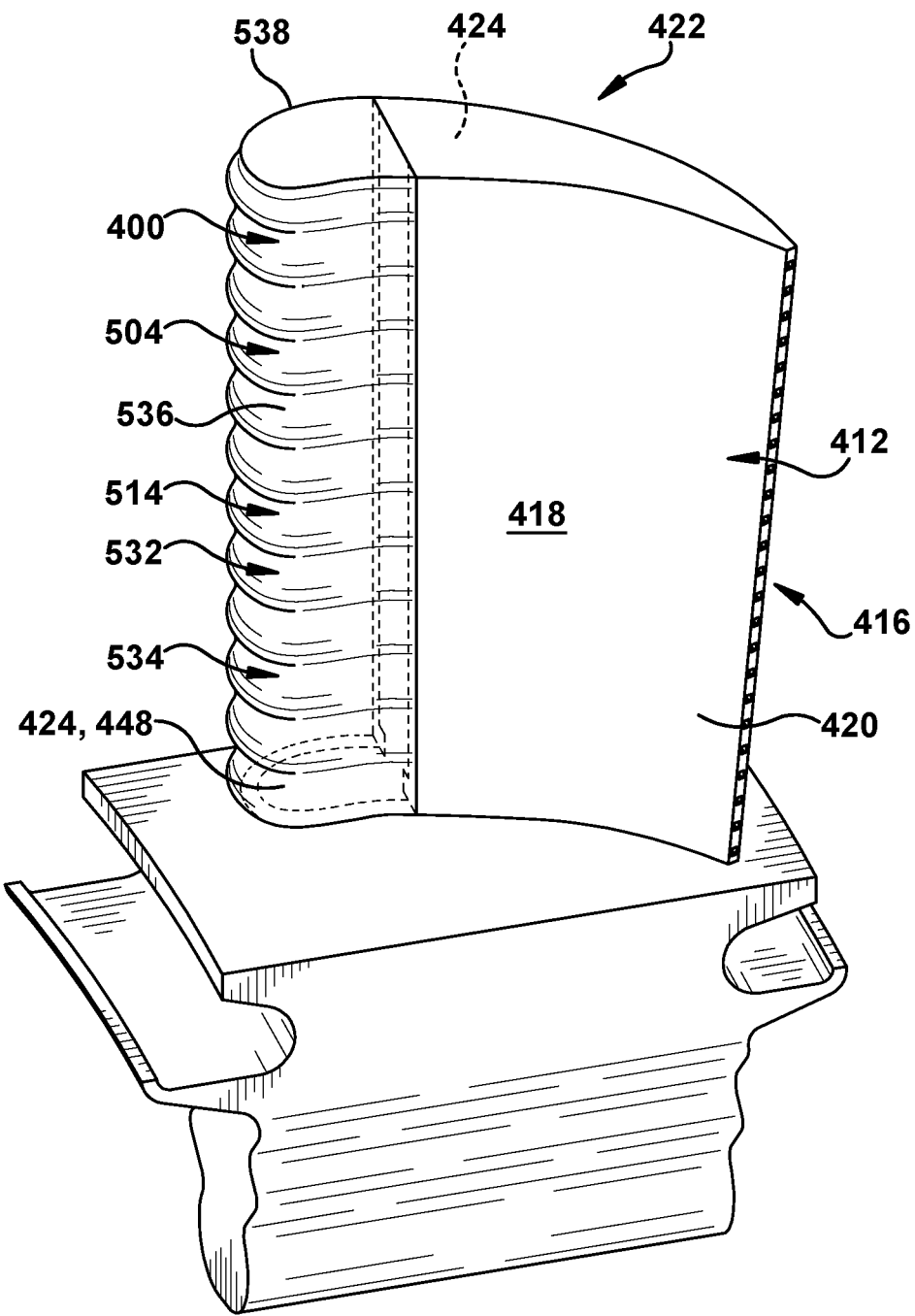

FIGS. 27-29 show perspective views of embodiments of a coupon 504 according to embodiments of the disclosure, and FIG. 30 shows a perspective view of turbine rotor blade 400 with another embodiment of a coupon 504 according to embodiments of the disclosure. In either embodiment, coupon 504 is coupled in cutout 526 (FIG. 26) to replace the predetermined area 528 (FIG. 26) of airfoil body 412. In accordance with embodiments of the disclosure, in contrast to conventional replacement edges, coupon 504 includes a first corrugated surface 532 on at least a portion of an outer surface 534 thereof. As shown best in FIG. 30, coupon 504 includes a concave pressure side outer wall 536 configured to mate with concave pressure side outer wall 420 of airfoil body 412. Coupon 504 also includes a convex suction side outer wall 538 configured to mate with convex suction side outer wall 422 of airfoil body 412. Concave pressure side outer wall 536 and convex suction side outer wall 538 of coupon 504 couple at a (new) leading edge 514. Coupon 504 may be coupled in cutout 526 (FIG. 26) using any now known or later developed metal coupling process, e.g., welding, brazing, laser welding, etc., which may include any finishing processing necessary to finish, e.g., smooth, the joint. As shown best in FIGS. 27-29, outer walls 536, 538 of coupon 504 form a radially extending chamber 542 configured to mate with airfoil radially extending chamber 524 (FIG. 26) (or whatever part of airfoil body is exposed by cutout 526). In this fashion, coupon 504 is provided with a first coupon coolant flow passage 546 (FIG. 28 only) configured to fluidly mate with an airfoil coolant flow passage 548 (FIG. 26) (exposed by cutout 526). As with coupon 404, as shown for example in FIG. 25 and FIG. 27, coupon 504 may also include a second corrugated surface 568 on at least a portion of an internal surface 570 thereof. Second corrugated surface 568 parallels first corrugated surface 532, as described herein.

Corrugated surface 532 may extend from leading edge 514 on one outer wall 536, 538 or both outer walls 536, 538 of coupon 504. The portion of outer surface of coupon 504 including first corrugated surface 532 may extend only partially along coupon 504 or may extend an entire axial length thereof. As illustrated in FIGS. 27-29, the portion of outer surface 534 of coupon 504 that includes corrugated surface 532 may include a first section 532A extending from leading edge 514, and a second section 532B, radially spaced from first section 532A, extending from leading edge 514. In the embodiment shown, first section 532A and second section 532B would be adjacent inner and outer platforms (116, 114 or 122 (FIG. 3) or tip shroud 124 (FIG. 3)), as the case may be, but that is not necessary in all instances as they can be radially space therefrom. In an alternative embodiment, shown in FIG. 30, the portion of outer surface 534 of coupon 504 that includes corrugated surface 532 may include the entire radial extent thereof.

Corrugated surface 532 of coupon 504 can take a variety of forms. For example, corrugated surface 532 can take any of the aforementioned forms described relative to corrugated surface(s) herein, and so may be varied in a number of ways including but not limited to: amplitude, wavelength, angle of approach (relative to the rotor), angle of exiting (relative to the rotor), waveform shape, curvature (relative to the rotor), length extending forward from leading edge 514, one side or both sides of coupon 504 on which provided, radial extent upon which provided (some or all, continuous or discontinuous), etc.

Coupon 504 can include any now known or later developed cooling structures therein. For example, FIG. 27 shows coupon 504 including a plurality of flow passages 554 extending from an interior surface thereof to outer surface 534 thereof, e.g., from radially extending chamber 542 to outer surface 534. Flow passages 554 can take any path through walls 536, 538 desired. In an alternative embodiment, shown in FIG. 28, coupon 504 may include one or more ribs 556 partitioning radially extending chamber 542 into a number of flow passages 558. Ribs 556 and flow passages 558 may match those exposed by cutout 526 (FIG. 26) and those in the leading edge removed by cutout 526 (FIG. 26), or they can create alternative flow paths within coupon 504, similar to those illustrated in FIGS. 21-24 for the trailing edge embodiment.

In another embodiment, shown in FIG. 29, coupon 504 may include an integral impingement cooling structure 571 positioned within radially extending chamber 542. As understood in the field, impingement cooling structure 571 extends along radially extending chamber 542 forming another passage therein, and includes a plurality of openings 572 (only a couple labeled in FIG. 29) therein allowing coolant passing through radially extending chamber 542 to exit through the openings to cool inner surface of coupon 504. Impingement cooling structure 571 is structured with coupon 504 and surrounding structure within turbine rotor blade 400 (FIG. 26) (e.g., airfoil body, platform, root, tip shroud, etc.) so as to allow coolant flow from one end of airfoil body 412 through radially extending chamber 542). Impingement cooling structure 571 may take the form of any now known or later developed structure providing the impingement cooling, e.g., a sleeve or other passage having openings 572 therein. A number of internal supports 574 may be used to position impingement cooling structure 571 within radially extending chamber 542.

Figure 31:
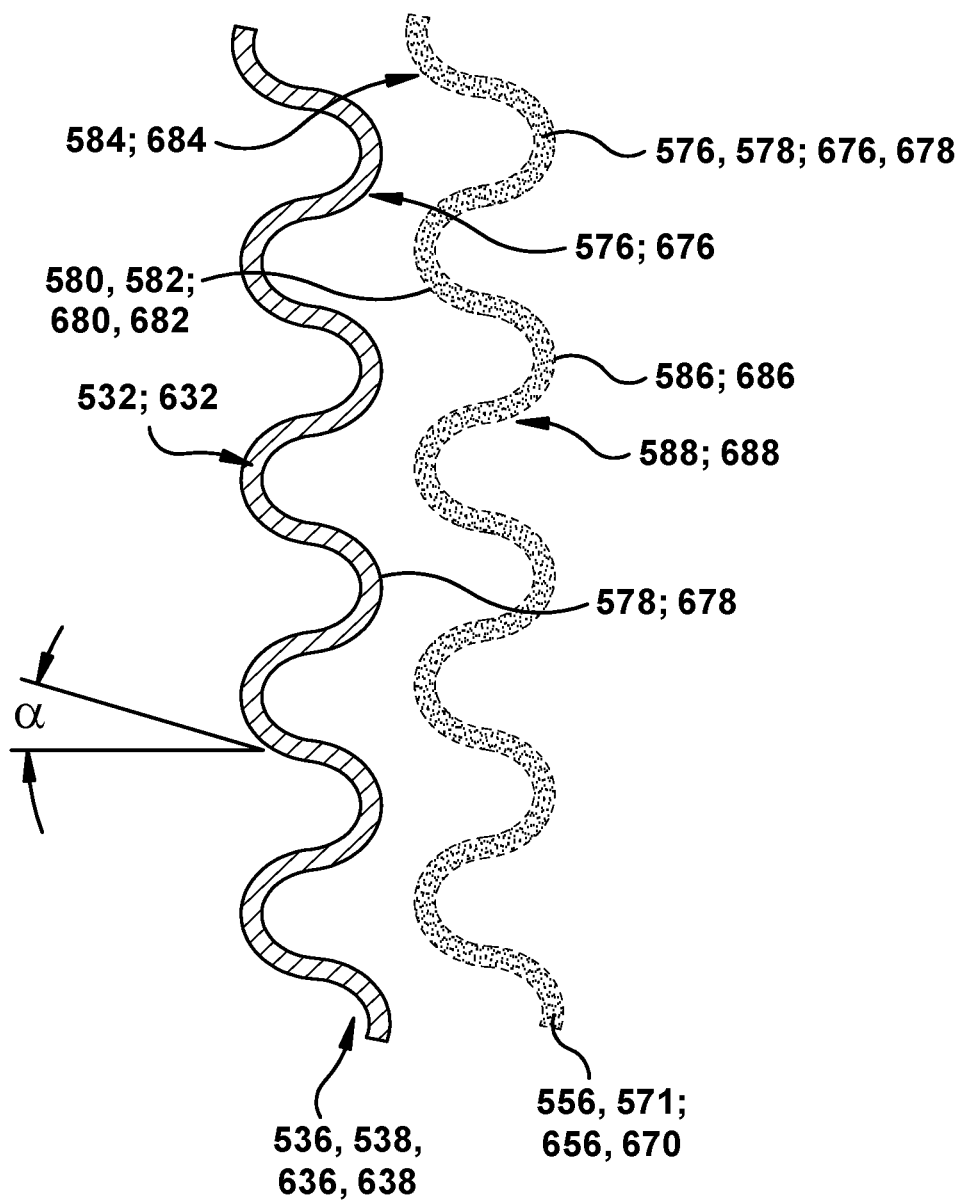

In any of the coupon embodiments described herein, the cooling structure may also include one or more additional corrugated surfaces. FIG. 31 shows a cross-sectional view along line B-B in FIG. 27 in solid lines, and along C-C in FIG. 28 in solid and phantom lines. FIG. 31 illustrates some of the corrugated surface possibilities. (Note, FIG. 31 does not show details of impingement cooling structure 571, e.g., internal supports or openings). In any of the embodiments disclosed in FIGS. 27-30, as shown in FIG. 31, coupon 504 may include a corrugated surface 576 on at least a portion of an internal surface 578 of outer wall(s) 536, 538. Corrugated surface 576 parallels corrugated surface 532, as described herein. In addition, as shown in phantom in FIG. 31, where the cooling structure creates a double wall arrangement with outer walls 536, 538 (e.g., as in FIGS. 28 and 29), ribs 556 (FIG. 28) or impingement cooling structure 571 (FIG. 29) may also include at least a portion of an outer surface 580 (FIG. 28), 582 (FIG. 29), respectively, thereof having a corrugated surface 584 paralleling corrugated surface 576 on inner surface 578 of outer wall(s) 536, 538. That is, corrugated surface 584 follows the contours of corrugated surface 576 in such a way that spacing between the two surfaces is substantially maintained. As noted herein, some variance in the parallelism may be possible in, for example, transition areas between adjacent structures. Further, the parallelism described herein is understood to be that possible within now known or later developed additive manufacturing tolerances. An inner surface 586 of ribs 556 or impingement cooling structure 571 may also have a corrugated surface 588 paralleling corrugated surface 584, so as to maintain a thickness of rib 556 or impingement cooling structure 571 along a length thereof.

Each coupon 404, 504 and/or cutout 426, 526 may also include any other now known or later developed structure ensuring proper coupling of coupon 404, 504 within cutout 426, 526, respectively, such as but not limited to: mating angled outwardly facing radial ends on the coupons and angled internally facing radial surfaces on the cutouts to allow operational pressure to force the coupon into the cutout.

Referring to FIGS. 33-37, the herein described teachings relating to coupons 404, 504 are illustrated as applied to a stationary turbine vane 402 (stationary blade) rather than a turbine rotor blade 400 (FIGS. 26-31).

Figure 32:
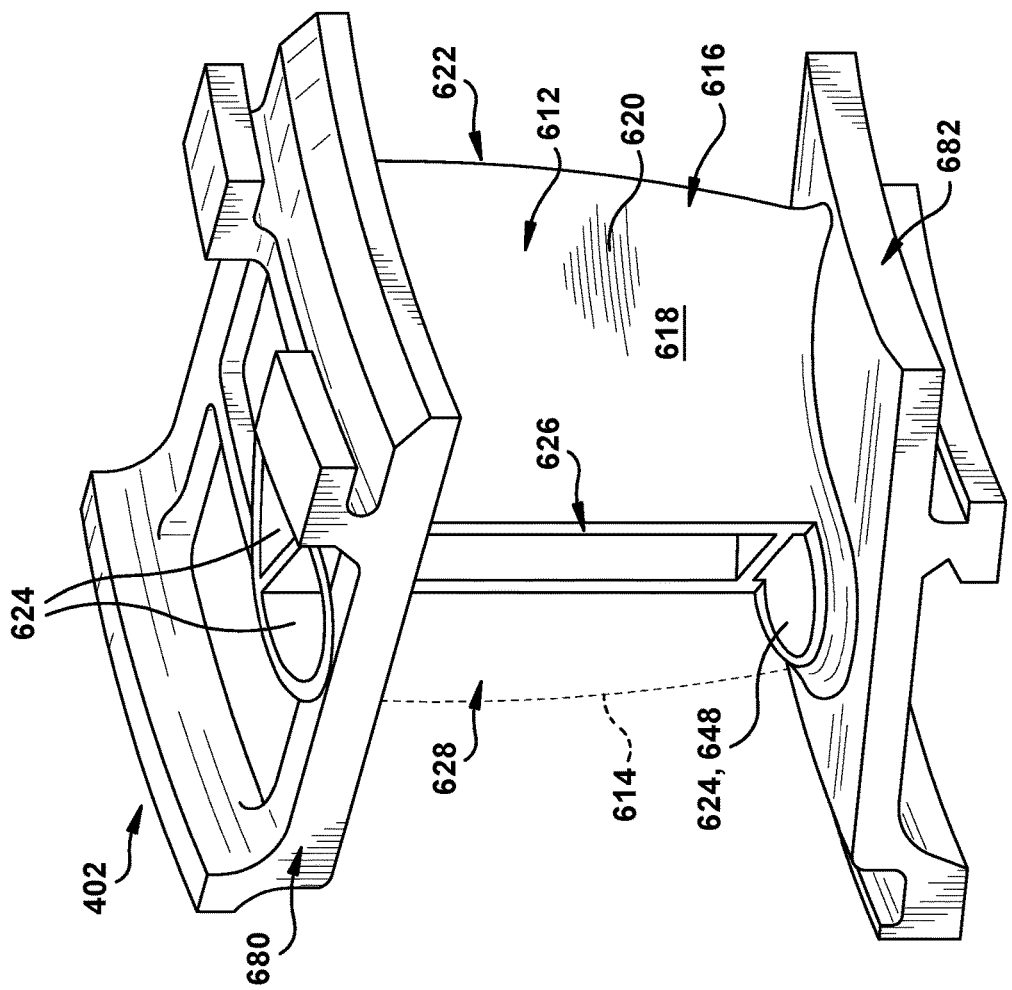
FIGS. 32-34 show various views of a coupon having a corrugated surface for a leading edge of a turbine vane according to embodiments of the disclosure.

FIG. 32 shows a perspective view of a preexisting turbine vane 402. Vane 402 is somewhat similar in structure to turbine rotor blade 400, except it is held stationary in a casing of the turbomachine and thus may include two platforms 680, 682 one at each radial end to mount vane 402 in a stationary position relative to a casing of the turbomachine. Vane 402 may include external and internal structure as described relative to turbine rotor blade 130 of FIGS. 4-6. In particular, vane 402 includes an airfoil body 612 having a leading edge 614 (shown in phantom, removed), a trailing edge 616 and a smooth outer surface 618. Smooth outer surface 618 applies to both a concave pressure side outer wall 620 and a convex suction side outer wall 622 extending between leading edge 614 and trailing edge 616. A radially extending chamber 624 may extend between outer walls 620, 622. Vane 402 is shown with a cutout 626 positioned within at least one of leading edge 614 (shown) and trailing edge 616. As illustrated in the example in FIG. 32, cutout 626 is positioned within leading edge 616, and removes a predetermined area 628 (shown by dashed lines) of airfoil body 612, i.e., from leading edge 616. Cutout 626 can be removed by any now known or later developed metal cutting technique, e.g., welding torch, electrical discharge machining (EDM), laser cutting, water jet cutting, etc. As illustrated, cutout 626 includes most if not all of a radial extent of airfoil body 612. It is emphasized, however, that cutout 626 can include any portion of airfoil body 612 in which wake mixing or different internal cooling structure is desired. Airfoil body 612 has a smooth outer surface 618.

Figure 33:
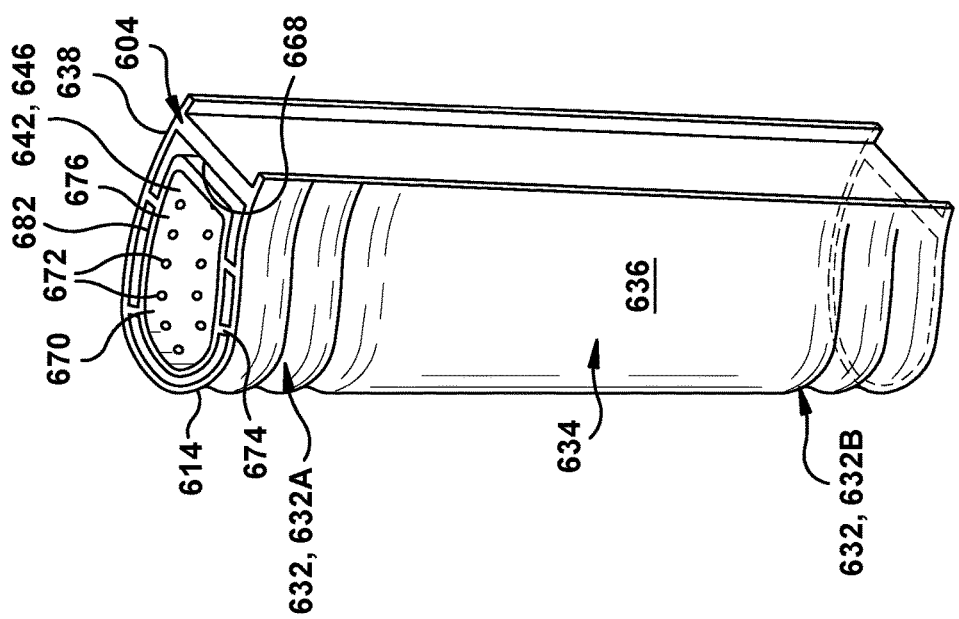
Figure 34:
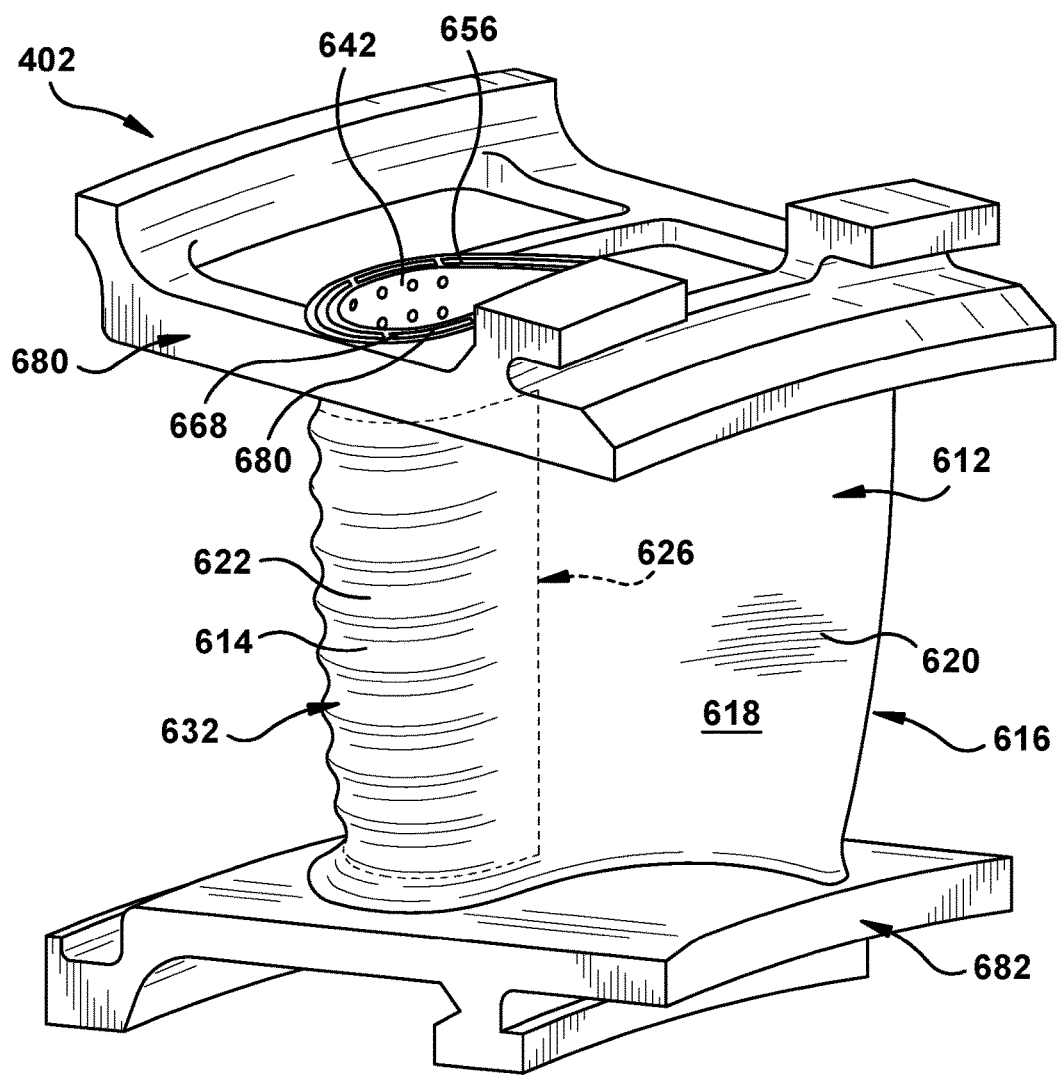

FIG. 33 shows a perspective view of an embodiment of a coupon 604 according to embodiments of the disclosure, and FIG. 34 shows a perspective view of vane 402 with another embodiment of a coupon 604 according to embodiments of the disclosure. In either embodiment, coupon 604 is coupled in cutout 626 (FIG. 32) to replace the predetermined area 628 (FIG. 32) of airfoil body 612. In accordance with embodiments of the disclosure, in contrast to conventional replacement edges, coupon 604 includes a first corrugated surface 632 on at least a portion of an outer surface 634 thereof. As shown best in FIG. 33, coupon 604 includes a concave pressure side outer wall 636 configured to mate with concave pressure side outer wall 620 of airfoil body 612. Coupon 604 also includes a convex suction side outer wall 638 configured to mate with convex suction side outer wall 622 of airfoil body 612. Concave pressure side outer wall 636 and convex suction side outer wall 638 of coupon 604 couple at a (new) leading edge 614. Coupon 604 may be coupled in cutout 626 (FIG. 32) using any now known or later developed metal coupling process, e.g., welding, brazing, laser welding, etc., which may include any finishing processing necessary to finish, e.g., smooth, the joint. Outer walls 636, 638 form a radially extending chamber 642 configured to mate with airfoil radially extending chamber 624 (FIG. 32) (or whatever part of airfoil body 612 is exposed by cutout 626). In this fashion, coupon 604 is provided with a first coupon coolant flow passage 646 (FIG. 33) configured to fluidly mate with an airfoil coolant flow passage 648 (FIG. 32) (exposed by cutout 626). Coupon 604 may include the same corrugated surfaces as described relative to FIGS. 26-30, and as illustrated in FIG. 31. That is, as shown in FIG. 31, a second corrugated surface 676 may be provided on at least a portion of an internal surface 678 of coupon 604. Second corrugated surface 676 parallels first corrugated surface 632, as described herein.

Corrugated surface 632 may extend from leading edge 614 on one side outer wall 636, 638 or both outer walls 636, 638 of coupon 604. The portion of outer surface of coupon 604 including first corrugated surface 632 may extend only partially along coupon 604 or may extend an entire axial length thereof. As illustrated in FIG. 33, the portion of outer surface 634 of coupon 604 that includes corrugated surface 632 may include a first section 632A extending from leading edge 614, and a second section 632B, radially spaced from first section 632A, extending from leading edge 614. In the embodiment shown, first section 632A and second section 632B would be adjacent inner and outer platforms 680, 682 (FIG. 31), but that is not necessary in all instances as they can be radially space therefrom. In an alternative embodiment, shown in FIG. 33, the portion of outer surface 634 of coupon 604 that includes corrugated surface 632 may include the entire radial extent thereof.

Corrugated surface 632 of coupon 604 can take a variety of forms. For example, corrugated surface 632 can take any of the aforementioned forms described relative to corrugated surface(s) herein, and so may be varied in a number of ways including but not limited to: amplitude, wavelength, angle of approach (relative to the rotor), angle of exiting (relative to the rotor), waveform shape, curvature (relative to the rotor), length extending forward from leading edge 614, one side or both sides of coupon 604 on which provided, radial extent upon which provided (some or all, continuous or discontinuous), etc.

Coupon 604 can include any now known or later developed cooling structures therein. For example, coupon 604 may include any of the cooling structures described relative to coupon 504 and FIGS. 27-31. In the example shown in FIG. 33, coupon 604 may include an integral impingement cooling structure 670 positioned within radially extending chamber 642. As understood in the field, impingement cooling structure 670 extends along radially extending chamber 642 forming another passage therein, and includes a plurality of openings 672 (only a couple labeled in FIG. 33) therein allowing coolant passing through radially extending chamber 642 to exit through the openings to cool inner surface of coupon 604. Impingement cooling structure 670 is structured with coupon 604 and surrounding structure within vane 402 (FIG. 32) (e.g., airfoil body, platform, root, tip shroud, etc.), so as to allow coolant flow from one end of airfoil body 412 through radially extending chamber 642. Impingement cooling structure 670 may take the form of any now known or later developed structure providing the impingement cooling, e.g., a sleeve or other passage having openings 672 therein. A number of internal supports 674 may be used to position impingement cooling structure 670 within radially extending chamber 642. In an alternative embodiment, shown in FIG. 34, coupon 604 may include a number of ribs 656 partitioning radially extending chamber 642 into a number of flow passages 668. Ribs 656 and flow passages 668 may match those exposed by cutout 626 (FIG. 32), or they can create alternative flow paths within coupon 604.

Coupon 604 may include one or more additional corrugated surfaces, similar to those described relative to coupon 504 and FIGS. 25 and 31. (Note, FIG. 31 does not show details of impingement cooling structure 670, e.g., internal supports or openings). For example, as noted herein, coupon 604 may include a corrugated surface 676 (FIG. 31) on at least a portion of an internal surface 678 (FIG. 31) of outer wall(s) 636, 638. Corrugated surface 676 (FIG. 31) parallels corrugated surface 632, as described herein. In addition, as shown in phantom in FIG. 31, where the cooling structure creates a double wall arrangement with outer walls 636, 638 (e.g., as in FIGS. 33 and 34), ribs 656 (FIG. 34) or impingement cooling structure 670 (FIG. 33) may also include at least a portion of an outer surface 680 (FIG. 34), 682 (FIG. 33), respectively, thereof having a corrugated surface 684 paralleling corrugated surface 676 on inner surface 678 of outer walls(s) 636, 638. That is, corrugated surface 684 follows the contours of corrugated surface 676 in such a way that spacing between the two surfaces is substantially maintained. As noted herein, some variance in the parallelism may be possible in, for example, transition areas between adjacent structures. Further, the parallelism described herein is understood to be that possible within now known or later developed additive manufacturing tolerances. An inner surface 686 of ribs 656 or impingement cooling structure 670 may also have a corrugated surface 688 paralleling corrugated surface 684, so as to maintain a thickness of rib 656 or impingement cooling structure 670 along a length thereof.

Figure 36:
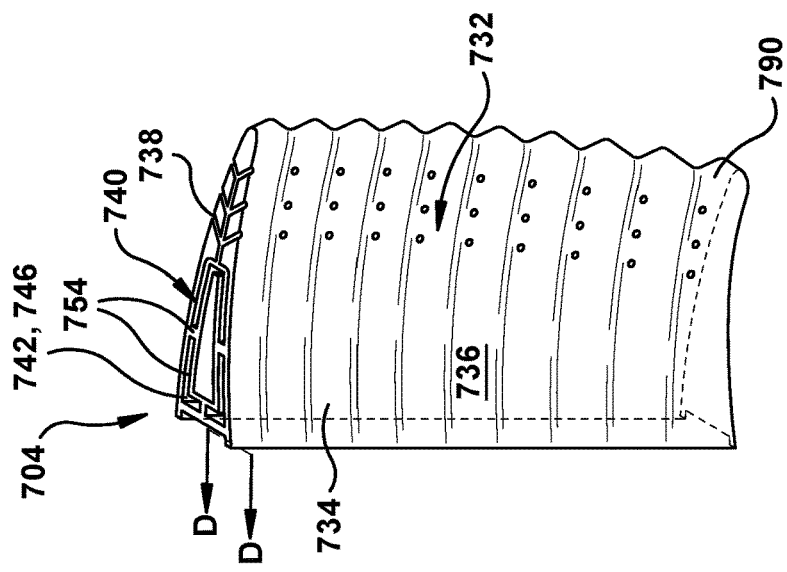
FIGS. 35-37 show various views of a coupon having a corrugated surface for a trailing edge of a turbine vane according to embodiments of the disclosure.
Figure 35:
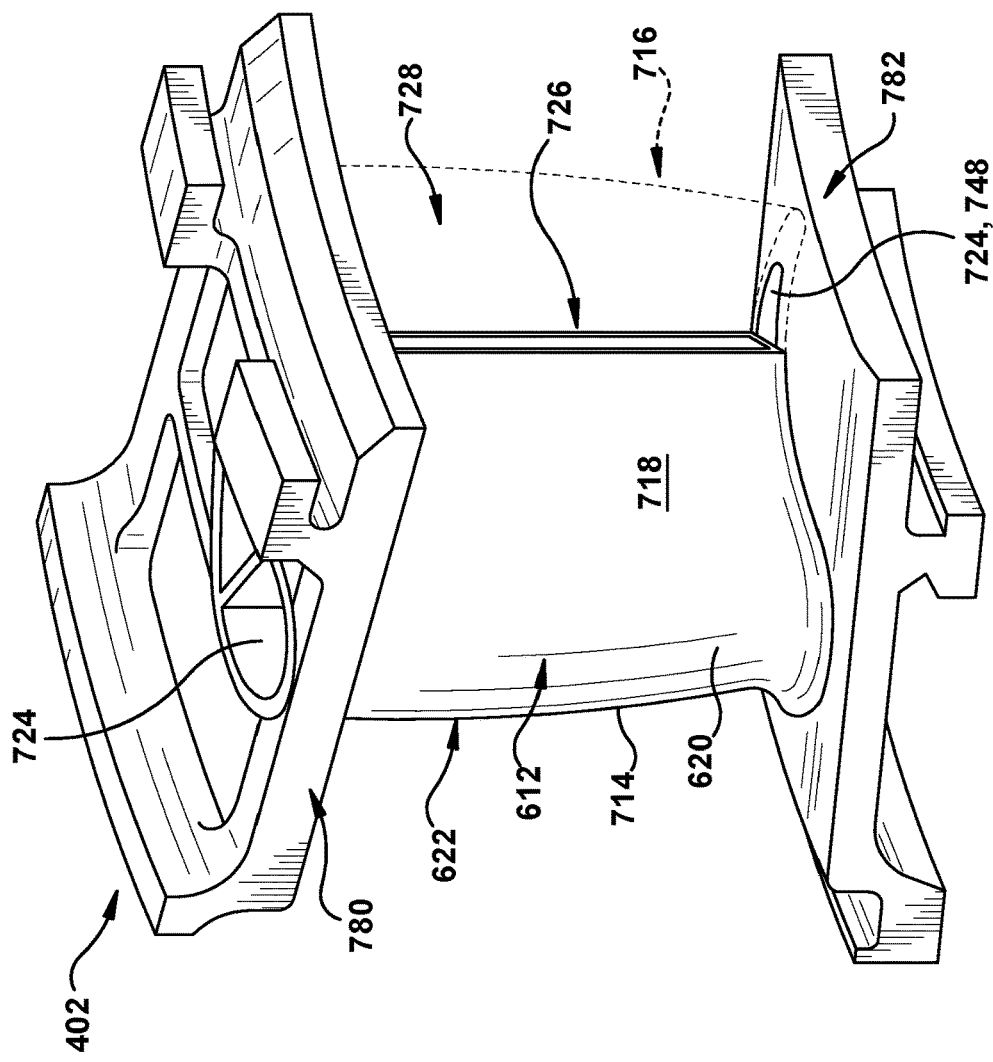
Figure 37:
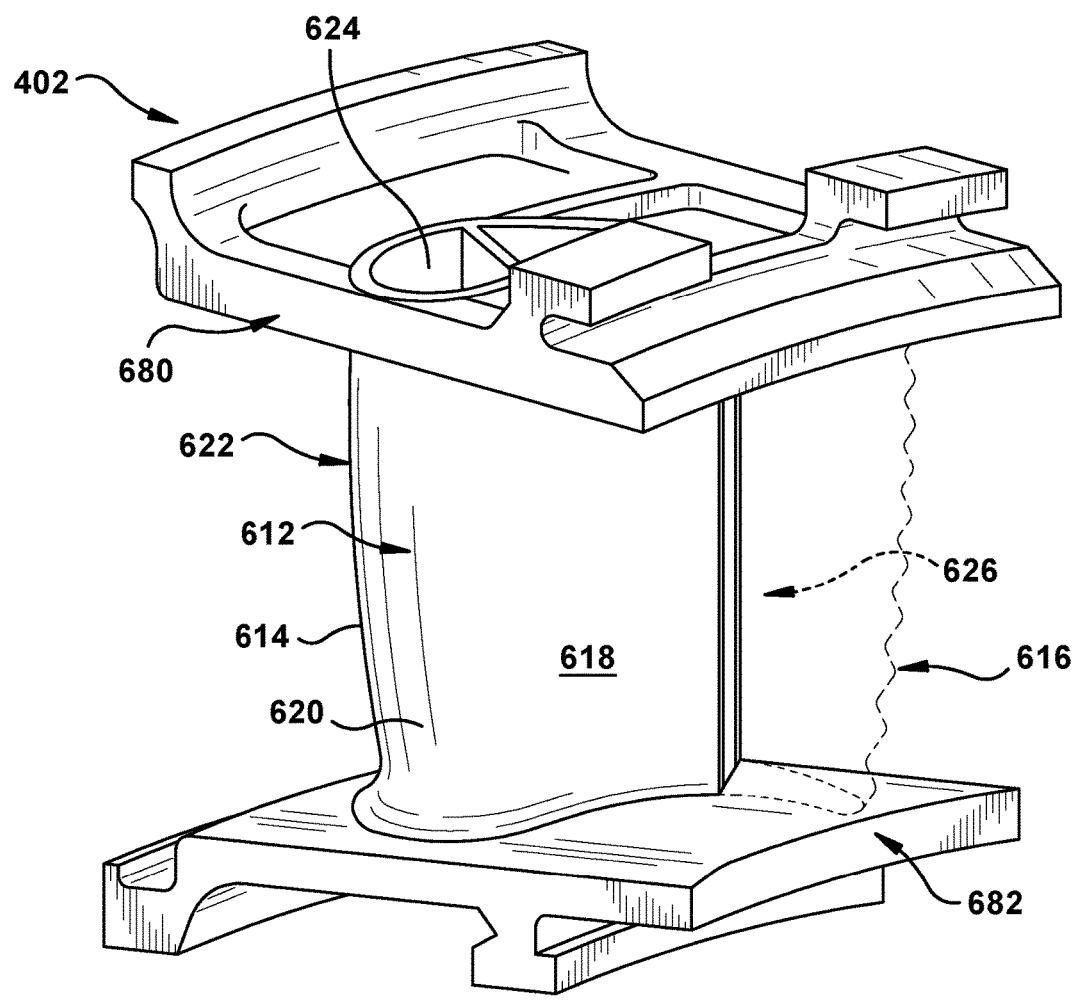

FIGS. 35-37 shows turbine vane 402 that is identical to that shown in FIG. 32, but with cutout 726 positioned within a trailing edge 716. As illustrated in the example in FIG. 35, cutout 726 is taken from within trailing edge 716, and removes a predetermined area 728 (shown by dashed lines) of airfoil body 612, i.e., from trailing edge 716. Cutout 726 can be removed by any now known or later developed metal cutting technique, e.g., welding torch, electrical discharge machining (EDM), laser cutting, water jet cutting, etc. As illustrated, cutout 726 includes most if not all of a radial extent of airfoil body 612. It is emphasized, however, that cutout 726 can include any portion of airfoil body 612 in which wake mixing or different internal cooling structure is desired.

As shown in FIG. 37, coupon 704 is coupled in cutout 726 (FIG. 35) to replace predetermined area 728 (FIG. 35) of airfoil body 612. In accordance with embodiments of the disclosure, as shown in FIG. 36, in contrast to conventional replacement edges, coupon 704 includes a first corrugated surface 732 on at least a portion of an outer surface 734 thereof. Coupon 704 includes a concave pressure side outer wall 736 configured to mate with concave pressure side outer wall 620 of airfoil body 612. Coupon 704 also includes a convex suction side outer wall 738 configured to mate with convex suction side outer wall 622 of airfoil body 612. Concave pressure side outer wall 736 and convex suction side outer wall 738 of coupon 704 couple at a (new) trailing edge 790. Coupon 704 may be coupled in cutout 726 (FIG. 35) using any now known or later developed metal coupling process, e.g., welding, brazing, laser welding, etc., which may include any finishing processing necessary to finish, e.g., smooth, the joint.

Corrugated surface 732 may extend from trailing edge 790 on one side outer wall 736, 738 or both outer walls 736, 738 of coupon 704. Further, corrugated surface 732 of coupon 704 can take a variety of alternative forms. For example, corrugated surface 732 can take any of the aforementioned forms described relative to corrugated surface(s) herein, and so may be varied in a number of ways including but not limited to: amplitude, wavelength, angle of approach (relative to the rotor), angle of exiting (relative to the rotor), waveform shape, curvature (relative to the rotor), length extending forward from trailing edge 790, one side or both sides of coupon 704 on which provided, radial extent upon which provided (some or all, continuous or discontinuous), etc.

Coupon 704 may be provided with a first coupon coolant flow passage 746 configured to fluidly mate with an airfoil coolant flow passage 748 (FIG. 35) (exposed by cutout 726). Coupon 704 may include a form of internal cooling structures 740 to either match that provided in cutout 726, or added in coupon 704 but mating with cooling structure present in airfoil body 612. It is emphasized that the illustrations are not all inclusive of the possibilities. In FIG. 36, coupon 704 includes a plurality of flow passages 754 extending from an interior surface thereof to outer surface 734 thereof, e.g., from radially extending chamber 742 to outer surface 734. Flow passages 754 can take any path through outer walls 736, 738 desired. Coupon 704 may also include any cooling structures 740 illustrated and described relative to coupon 404 in FIGS. 20-24. For example, coupon 704 could include a pin bank 450 (as in FIGS. 20 and 22) within first coupon coolant flow passage 746, e.g., positioned between outer concave wall 736 of coupon 704 and convex outer wall 738 of coupon 704. In another embodiment, coupon 704 may include a first coupon rib that partitions coupon radially extending chamber 742 to form a first coupon coolant flow passage, like in FIG. 22, 23 or 24. In FIG. 22, the rib is similar to rib 290 (FIG. 8) and acts as a fin within chamber 442 (742), while in FIGS. 23 and 24, the rib partitions chamber 442 (742) into a first coupon flow passage and a second coupon flow passage on an opposing side of the rib, e.g., similar to ribs 263, 264 in FIG. 8. As in FIG. 22, coupon 704 could include a pin bank positioned between concave pressure side outer wall 736 of coupon 704 or convex suction side outer wall 738 of coupon 704 and the rib. The preexisting turbine vane may include an airfoil body 712 (FIG. 35) having an airfoil radially extending chamber 724 (FIG. 35) therein and an airfoil rib (e.g., like rib 263 in FIG. 8) partitioning airfoil radially extending chamber 724 to form an airfoil coolant flow passage therein, similar to those shown in, for example, FIG. 6. And, cutout 726 (FIG. 35) may expose the airfoil rib and the airfoil coolant flow passage in such a way that coupon 704 can be configured to mate with the airfoil rib and airfoil coolant flow passage. In one embodiment, coupon 704 may replace cooling structure provided in cutout 726 but add corrugated surface 732. For example, coupon 704 of FIG. 35 could be used with a turbine vane having passages like the turbine rotor blade in FIG. 6 to provide identical cooling structures 740, but add corrugated surface 732. Alternatively, as shown in for example FIG. 35, coupon 704 need not have identical cooling structures 740 as those of the preexisting turbine vane. Rather, similar to coupon 404 in FIG. 24, coupon 704 may include at least one second coupon rib partitioning coupon radially extending chamber 742 into at least one second coupon coolant flow passage. The second coupon flow passage(s) (464 in FIG. 24) may have a different shape than first coupon coolant flow passage, and may not mate with coolant flow passages exposed by cutout 726 in the preexisting blade. In the example in FIG. 24, the second coupon flow passage 464 starts part way along a radial extent of coupon, e.g., 704 in FIG. 36. In this fashion, coupon 704 can provide additional and/or improved cooling compared to that provided in cutout 726, and adds corrugated surface 732 for wake mixing. It is emphasized that coupon flow passages can be configured in any now known or later developed arrangement that is different than that provided in cutout 726.

As shown in FIG. 36, coupon 704 may also include a crenulated trailing edge 790, similar to that described elsewhere herein, and meshing with first corrugated surface 732. As shown in FIG. 36, coupon 704 may include first coupon coolant flow passage 746 and a plurality of coolant flow passages 754 passing from first coupon coolant flow passage 746 through crenulated trailing edge 790 of the coupon. Internal cooling structure 740 may have similar cross-sectional layout as shown in FIG. 25 for coupon 404. FIG. 25 shows a cross-section along line D-D in FIG. 36. Here, coupon 704 may include a second corrugated surface 768 on at least a portion of an internal surface 770 thereof. Second corrugated surface 768 parallels first corrugated surface 732, as described herein.

Each coupon 604, 704 and/or cutout 626, 726 may also include any other now known or later developed structure ensuring proper coupling of coupon 604, 704 within cutout 626, 726, respectively, such as but not limited to mating angled outwardly facing radial ends on the coupons and angled internally facing radial surfaces on the cutouts to allow operational pressure to force the coupon into the cutout. Corrugated surface(s) 732, etc., may take any form of corrugated surface described herein.

With further regard to coupons 404, 504, while coupons 404 and 504 for turbine rotor blade 400 have been each described separately herein, as shown in FIG. 38, they may be applied simultaneously to the same turbine rotor blade 400. In this fashion, turbine rotor blades similar to those shown in FIGS. 7 and 8 may be formed even though they may have been originally created without corrugated outer surfaces. Similarly, while coupons 604 and 704 for turbine vane 402 have been each described separately herein, as shown in FIG. 39, they may be applied simultaneously to the same turbine vane 402.

In operation, the external corrugated surfaces result in an alternating radial pressure gradient along the airfoil body's span. The alternating pressure gradient induces radial movement of flow, coalescing into discrete vortices at the trailing edge of the airfoil body. These vortices enhance the mixing of the airfoil body's wake before entering the downstream row. Enhanced wake mixing can be leveraged in multiple ways. For example, the wake mixing reduces the magnitude of the wake flow impinging on a downstream object such as an adjacent rotating or stationary blade row such that the aeromechanical loading is reduced. Moreover, the wake mixing facilitates reducing the axial distance necessary between blade rows and downstream components. For a given gap between adjacent blade rows, the thermal efficiency of the turbine may be increased through reduction in aerodynamic pressure loss, resulting in higher power density of the turbomachine, e.g., a gas turbine system. As a result, turbomachine efficiency and performance are facilitated to be improved in comparison to turbomachines using blades having airfoil bodies without corrugated surfaces.

Where coupons are used to provide corrugated surfaces to a preexisting blade, the coupons can provide internal cooling structures not previously present in the blade, thus providing improved cooling thereof and lengthening a lifespan of the part.

Blade 200 (rotating blades and stationary vanes) or coupons 404, 504, 604, 704 may include any metal or metal compound capable of withstanding the environment in which used. Blade 200 or coupons 404, 504, 604, 704 can be cast, or advantageously made using additive manufacturing. In regard to the latter manufacturing format, each surface and, in particular, corrugated surface(s) etc., may include surfaces extending at no greater than 45° relative to horizontal, as noted herein. That is, none of the ridges or grooves of corrugate surface(s) or edges of crenulated trailing edge extend at greater than 45° relative to horizontal. It is through additive manufacturing that the blade or coupons can be formed including a plurality of integral material layers.

As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser melting (SLM) and direct metal laser melting (DMLM). In the current setting, DMLM has been found advantageous.

Figure 40:
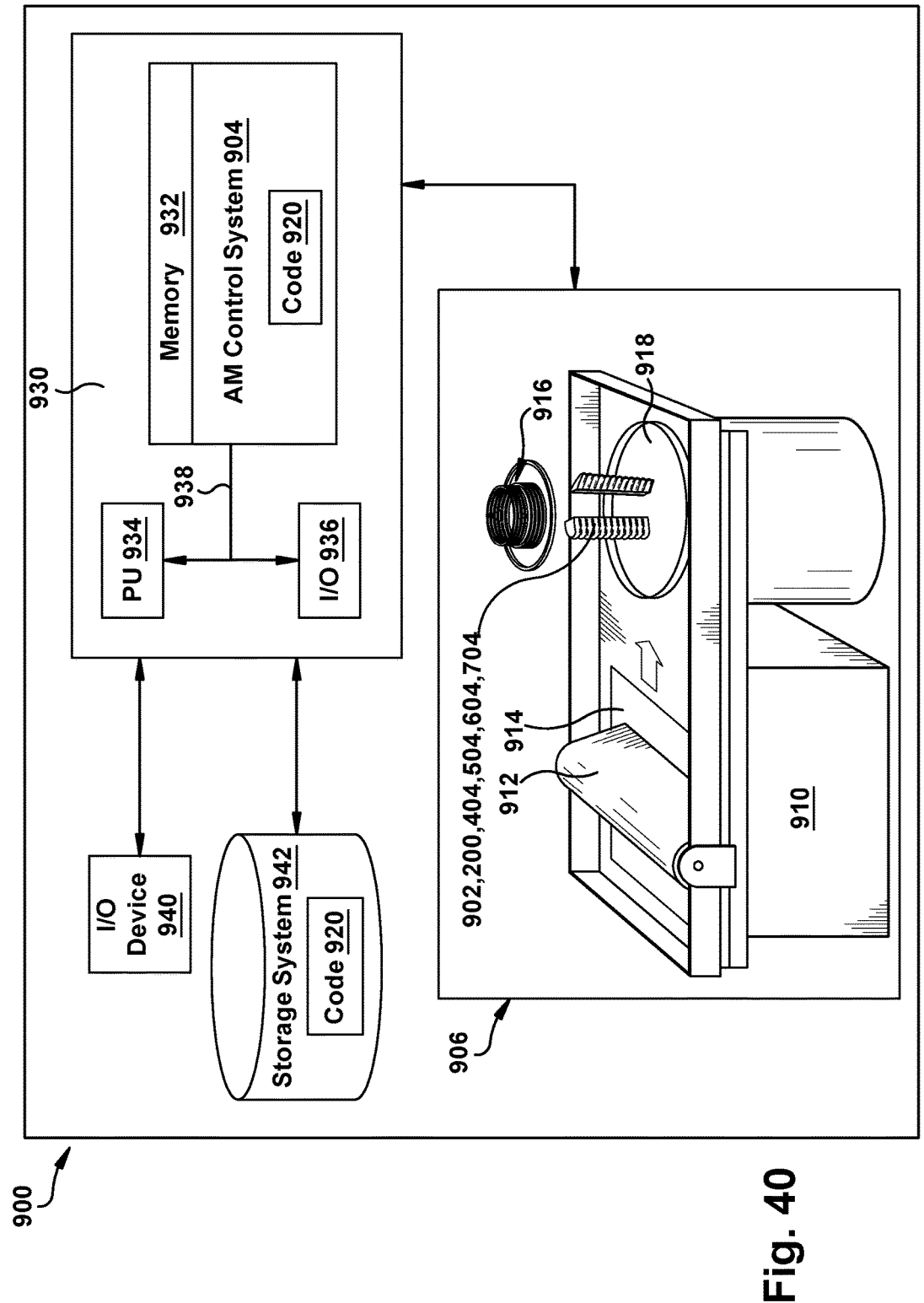
FIG. 40 shows a schematic view of an additive manufacturing process including a non-transitory computer readable storage medium storing code representative of a blade according to embodiments of the disclosure.

To illustrate an example of an additive manufacturing process, FIG. 40 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as blade 200 or coupons 404, 504, 604, 704 as described herein. AM system 900 generally includes a computerized additive manufacturing (AM) control system 904 and an AM printer 906. AM system 900, as will be described, executes code 920 that includes a set of computer-executable instructions defining blade 200 or coupons 404, 504, 604, 704 to physically generate the object using AM printer 906. Each AM process may use different raw materials in the form of, for example, fine-grain powder, liquid (e.g., polymers), sheet, etc., a stock of which may be held in a chamber 910 of AM printer 906. In the instant case, blade 200 or coupons 404, 504, 604, 704 may be made of a metal or a metal compound. As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where the material is a polymer or where a metal binder jetting process is used. In the example shown, a laser or electron beam 916 fuses particles for each slice, as defined by code 920, but this may not be necessary where a quick setting liquid plastic/polymer is employed. Various parts of AM printer 906 may move to accommodate the addition of each new layer, e.g., a build platform 918 may lower and/or chamber 910 and/or applicator 912 may rise after each layer. AM control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as AM control system 904, that is stored in memory 932 and/or storage system 942 under instructions from code 920 representative of blade 200 or coupons 404, 504, 604, 704, described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, touchscreen, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile smartphone, a personal data assistant, etc.

Additive manufacturing processes begin with a non-transitory computer readable storage medium (e.g., memory 932, storage system 942, etc.) storing code 920 representative of blade 200 or any coupon 404, 504, 604, 704. As noted, code 920 includes a set of computer-executable instructions defining blade 200 or any coupon 404, 504 that can be used to physically generate, among other things, corrugated surface(s), upon execution of the code by system 900. For example, code 920 may include a precisely defined 3D model of blade 200 or coupons 404, 504, 604, 704 and can be generated from any of a large variety of well-known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing blade 200 or coupons 404, 504, 604, 704 into a series of thin slices that it assembles using AM printer 906 in successive layers of liquid, powder, sheet or other material. In the DMLM example, each layer is melted to the exact geometry defined by code 920 and fused to the preceding layer. Subsequently, blade 200 or coupons 404, 504, 604, 704 may be exposed to any variety of finishing processes, e.g., minor machining, sealing, polishing, assembly to other part of the blade, etc. Coupons 404, 504, 604, 704 may be coupled to their respective airfoil bodies using any of the coupling methods described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbine rotor blade comprising:
   a platform;
   a dovetail extending radially from the platform;
   an airfoil body extending radially from the platform, opposite the dovetail, the airfoil body including:
      a leading edge extending radially from the platform,
      a trailing edge extending radially from the platform, and axially opposite the leading edge, and
      a smooth outer surface extending between the leading edge and the trailing edge;
   a cutout within at least one of the leading edge and the trailing edge, the cutout removing a predetermined area of the airfoil body; and
   a coupon coupled in the cutout to replace the predetermined area of the airfoil body, the coupon including:
      a first corrugated surface on at least a portion of an outer surface of the coupon, the first corrugated surface including a plurality of radially-spaced ridges and grooves, each of the plurality of radially-spaced ridges and grooves extend axially over at least a portion of the outer surface of the coupon;
      a second corrugated surface on at least a portion of an inner surface of the coupon, opposite the outer surface, the second corrugated surface paralleling the first corrugated surface; and
      an impingement cooling structure positioned within a coupon radially extending chamber formed in the coupon, the impingement cooling structure including:
         a third corrugated surface on at least a portion of an outer surface of the impingement cooling structure, the third corrugated surface paralleling the first corrugated surface of the coupon.

2. The turbine rotor blade of claim 1, wherein the airfoil body includes an airfoil coolant flow passage therein, the cutout exposing the airfoil coolant flow passage, and
   wherein the coupon includes a first coupon coolant flow passage configured to fluidly mate with the airfoil coolant flow passage.

3. The turbine rotor blade of claim 2, wherein the coupon includes a plurality of flow passages extending from an interior surface thereof to the outer surface thereof.

4. The turbine rotor blade of claim 2, wherein the cutout is positioned in the trailing edge, and the coupon includes a pin bank within the first coupon coolant flow passage.

5. The turbine rotor blade of claim 2, wherein the airfoil body includes an airfoil radially extending chamber therein and an airfoil rib partitioning the airfoil radially extending chamber to form the airfoil coolant flow passage therein, the cutout exposing the airfoil rib and the airfoil coolant flow passage, and
   wherein the coupon includes a first coupon rib partitioning the coupon radially extending chamber to form the first coupon coolant flow passage.

6. The turbine rotor blade of claim 5, wherein the coupon includes at least one second coupon rib partitioning the coupon radially extending chamber into at least one second coupon coolant flow passage, the at least one second coupon flow passage having a different shape than the first coupon coolant flow passage.

7. The turbine rotor blade of claim 1, wherein the cutout is positioned in the trailing edge, and the coupon includes a crenulated trailing edge meshing with the first corrugated surface.

8. The turbine rotor blade of claim 7, wherein the coupon includes a first coupon coolant flow passage and a plurality of coolant flow passages passing from the first coupon coolant flow passage through the trailing edge of the coupon.

9. The turbine rotor blade of claim 1, wherein the impingement cooling structure further includes a fourth corrugated surface on at least a portion of an inner surface of the impingement cooling structure, opposite the outer surface, the fourth corrugated surface paralleling the third corrugated surface.

10. A coupon for replacing a cutout of a predetermined area in an airfoil body of a turbine rotor blade, the airfoil body having a leading edge extending radially from a platform of the turbine rotor blade and opposite a dovetail extending from the platform, a trailing edge extending radially from the platform and axially opposite the leading edge, and a smooth outer surface extending between the leading edge and the trailing edge, the cutout within at least one of the leading edge and the trailing edge of the airfoil body, the coupon comprising:
   a first corrugated surface on at least a portion of an outer surface thereof, the first corrugated surface including a plurality of radially-spaced ridges and grooves, each of the plurality of radially-spaced ridges and grooves extending axially over at least a portion of the outer surface of the coupon;
   a second corrugated surface on at least a portion of an inner surface thereof, opposite the outer surface, the second corrugated surface paralleling the first corrugated surface; and
   an impingement cooling structure positioned within a coupon radially extending chamber at least partially defined by the inner surface, the impingement cooling structure including:
      a third corrugated surface on at least a portion of an outer surface of the impingement cooling structure, the third corrugated surface paralleling the first corrugated surface.

11. The coupon of claim 10, further comprising a first coupon coolant flow passage configured to fluidly mate with an airfoil coolant flow passage in the airfoil body exposed by the cutout.

12. The coupon of claim 11, wherein the coupon includes a pin bank within the first coupon coolant flow passage.

13. The coupon of claim 11, wherein the coupon includes:
   a first coupon rib partitioning the coupon radially extending chamber to form the first coupon coolant flow passage, and
   at least one second coupon rib partitioning the coupon radially extending chamber into at least one second coupon coolant flow passage, the at least one second coupon flow passage having a different shape than the first coupon coolant flow passage.

14. The coupon of claim 10, wherein the coupon includes a plurality of flow passages extending from an interior surface thereof to the outer surface thereof.

15. The coupon of claim 10, wherein the impingement cooling structure further includes a fourth corrugated surface on at least a portion of an inner surface of the impingement cooling structure, opposite the outer surface, the fourth corrugated surface paralleling the third corrugated surface.

16. The coupon of claim 10, wherein the coupon includes:
   a crenulated trailing edge meshing with the first corrugated surface;
   a first coupon coolant flow passage therein; and
   a plurality of coolant flow passages passing from the first coupon coolant flow passage through the crenulated trailing edge of the coupon.

17. A non-transitory computer readable storage medium storing code representative of a coupon for replacing a cutout of a predetermined area in one of a leading edge or a trailing edge in an airfoil body of a turbine rotor blade, each extending radially from a platform of the turbine rotor blade, the coupon physically generated upon execution of the code by a computerized additive manufacturing system, the code comprising:
   code representing the coupon, the coupon including:
      a first corrugated surface on at least a portion of an outer surface thereof, the first corrugated surface including a plurality of radially-spaced ridges and grooves, each of the plurality of radially-spaced ridges and grooves extending over a span of at least a portion of the outer surface of the coupon;
      a second corrugated surface on at least a portion of an inner surface thereof, opposite the outer surface, the second corrugated surface paralleling the first corrugated surface; and
      an impingement cooling structure positioned within a coupon radially extending chamber formed in the coupon, the impingement cooling structure including:
         a third corrugated surface on at least a portion of an outer surface of the impingement cooling structure, the third corrugated surface paralleling the first corrugated surface of the coupon.

18. The non-transitory computer readable storage medium of claim 17, wherein the code further comprises:
   a fourth corrugated surface on at least a portion of an inner surface of the impingement cooling structure, opposite the outer surface of the impingement cooling structure, the fourth corrugated surface parallel to the third corrugated surface.

* * * * *